US012674907B2

(12) United States Patent
Wilson

(10) Patent No.: US 12,674,907 B2
(45) Date of Patent: Jul. 7, 2026

(54) GEOLOGIC FAULT SEAL CHARACTERIZATION

(71) Applicant: Schlumberger Technology Corporation, Sugar Land, TX (US)

(72) Inventor: Paul Wilson, Leeds (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 400 days.

(21) Appl. No.: 18/364,810

(22) Filed: Aug. 3, 2023

(65) Prior Publication Data

US 2024/0045095 A1     Feb. 8, 2024

Related U.S. Application Data

(60) Provisional application No. 63/395,146, filed on Aug. 4, 2022.

(51) Int. Cl.
*G01V 1/50*          (2006.01)
*G01V 1/46*          (2006.01)
*G06N 20/20*         (2019.01)

(52) U.S. Cl.
CPC .................. *G01V 1/50* (2013.01); *G01V 1/46* (2013.01); *G06N 20/20* (2019.01)

(58) Field of Classification Search
CPC ...................................................... G01V 20/00
See application file for complete search history.

(56) References Cited

U.S. PATENT DOCUMENTS

| | | | | |
|---|---|---|---|---|
| 7,210,342 B1 * | 5/2007 | Sterner | .................. | E21B 21/01 |
| | | | | 73/152.23 |
| 2009/0125238 A1 * | 5/2009 | Barboza | .............. | E21B 49/0875 |
| | | | | 702/11 |
| 2010/0235154 A1 * | 9/2010 | Meurer | .................. | E21B 47/00 |
| | | | | 703/10 |
| 2011/0054869 A1 * | 3/2011 | Li | .......................... | G01V 20/00 |
| | | | | 703/10 |
| 2012/0016648 A1 * | 1/2012 | Myers | .................... | G01V 11/00 |
| | | | | 703/9 |

(Continued)

OTHER PUBLICATIONS

Wilson, Paul. A Data Science Approach to Uncertainty Evaluation in Fault-Seal Analysis for Exploration Applications in Siliciclastic Reservoirs. SPE Journal (Feb. 2023), pp. 1-13. SPE-214330-PA; doi: 10.2118/214330-PA.

(Continued)

*Primary Examiner* — Shelby A Turner
*Assistant Examiner* — Ibrahim Nagi Shohatee
(74) *Attorney, Agent, or Firm* — Kyle R. Miiler

(57)                    ABSTRACT

A method can include stochastically generating at least fifty realizations for a subsurface geologic environment by sampling distributions for a number of parameters that characterize the subsurface geologic environment, where the at least fifty realizations represent different results for an actual, physical characteristic of the subsurface geologic environment; ranking the number of parameters with respect to influence on the different results; and generating result predictions using a trained machine learning model for variations in values of at least the top ranked parameter, wherein the trained machine learning model is trained using at least a portion of the at least fifty realizations and their corresponding different results.

20 Claims, 22 Drawing Sheets

(56) References Cited

U.S. PATENT DOCUMENTS

| | | | | |
|---|---|---|---|---|
| 2016/0215607 A1* | 7/2016 | Lemons | ................. | E21B 43/26 |
| 2018/0284758 A1* | 10/2018 | Cella | ..................... | H02M 1/12 |
| 2021/0270130 A1* | 9/2021 | Lu | .......................... | E21B 44/00 |
| 2023/0222397 A1* | 7/2023 | Mohan | ................... | E21B 41/00 |
| | | | | 706/13 |

OTHER PUBLICATIONS

Land, D. H., "Figure 81—Tynemouth Structure Contrast" in Geology of the Tynemouth District, London, England: Her Majesty's Stationery Office, 1974, available on the internet for download at [https://webapps.bgs.ac.uk/Memoirs/docs/B01496.html], 1 page.

Allan, U. S., "Model for Hydrocarbon Migration and Entrapment Within Faulted Structures", AAPG Bulletin, 1989, 73, pp. 803-811.

Bretan, P. et al., "Fault-Seal Analysis for CO2 Storage: an example from the Troll area, Norwegian Continental Shelf", Petroleum Geoscience, 2011, 17(2), pp. 181-192.

Bretan, P. et al., "Using calibrated shale gouge ratio to estimate hydrocarbon col. heights", AAPG Bulletin, 2003, 87(3), pp. 397-413.

Brown, A. S., "Capillary effects on fault-fill sealing", AAPG Bulletin, 2003 87, pp. 381-395.

Childs, C. et al., "Complexity in fault zone structure and implications for fault seal prediction", Norwegian Petroleum Society Special Publication, 1997, 7 (C ) pp. 61-72.

Childs, C. et al., "Calibrating fault seal using a hydrocarbon migration model of the Oseberg Syd area, Viking Graben", Marine and Petroleum Geology, 2009, 26(6), pp. 764-774.

Clarke, S. M. et al. "Modeling the effects of stratigraphical uncertainty on fault seal and trap-fill faulted structures", Petroleum Geoscience, 2006, 12(2), pp. 143-156.

Conway, D. "The Data Science Venn Diagram", downloaded from the internet on Apr. 3, 2025 from[http://drewconway.com/zia/2013/3/26/the-data-science-venn-diagram], 2015, 3 pages.

Corona, F. V. et al., "Multi-fault analysis scorecard: testing the stochastic approach in fault seal prediction", Geological Society, London, Special Publications, 2010, 347, pp. 317-332.

Dee, S. J. et al., "A comparison between deterministic and stochastic fault seal techniques", Geological Society, London, Special Publications, 2007, 292, pp. 259-270.

Fisher, Q. J. et al. "Fluid-flow properties of faults in sandstone: The importance of temperature history", Geological Society of America, 2003, 31(11), pp. 965-968.

Freeman, S. R., et al., "Fault seal mapping- incorporating geometric and property uncertainty", Geological Society, London, Special Publications, 2008, 309, pp. 5-38.

Freeman, S. R. et al., "Cross-fault sealing, baffling and fluid flow in 3D geological models: tools for analysis, visualization and interpretation", Geological Society of London, Special Publications, 2010, 347, pp. 257-282.

Friedman, J. "Greedy Function Approximation: A Gradient Boosting Machine", The Annals of Statistics, 1999, 29(5), 44 pages.

Hubbert, M. K., "Entrapment of Petroleum Under Hydrodynamic Conditions", AAPG Bulletin, 1953, 37, pp. 1954-2026.

James, W. R. et al., "Fault-seal analysis using a stochastic multifault ppproach", AAPG Bulletin, 2004, 88(7), pp. 885-904.

Jones, R. M. et al., "An integrated, quantitative approach to assessing fault-seal 4isk", AAPG Bulletin, 2003, 87(3), pp. 507-524.

Karolyte, R., et al., "Fault seal modelling-the influence of fluid properties on fault sealing capacity in hydrocarbon and CO2 systems", Petroleum Geoscience, 2019, 26 (3), pp. 481-497.

Knipe, R. J, "Faulting processes and fault seal", In Structural and Tectonic Modelling and its Application to Petroleum Geology, Norwegian Petroleum Society Special Publication No. 1, 1992, pp. 325-342.

Knipe, R. J.et al., "Fault seal analysis: successful methodologies, application and future directions", Norwegian Petroleum Society Special Publication, 1997, 7(C), pp. 15-38.

Lindsay, N. G. et al., "Outcrop studies of shale smears on fault surfaces", in The Geological Modelling of Hydrocarbon Reservoirs and Outcrop Analogues, eds. S. S. Flint and I.D. Bruant, Special Publication No. 15 of the Interntional Association of Sedimentologists, 1993, pp. 113-123.

Murtagh, F., "Multilayer perceptrons for classification and regression", Neurocomputing 2, 1991, (5/6), pp. 183-197.

O"Mara, P. T. et al., "Sequence Stratigraphy of Coastal Alluvial Plain Westphalian B Coal Measures in Northumberland and the Southern North Sea", Intational Joural of Coal Geology, 1999, 42, pp. 33-62.

Pedregosa, F., et al., "Scikit-Learn: Machine Learning in Python", Journal of Machine Learning Research, 2011, 12, pp. 2825-2830.

Ridd, M. F. et al., "A Deep Borehole at Harton on the Margin of the Northumbrian Trough", Proceedings of the Yorkshire Geological Society, 1970, 38(1)(4), pp. 75-103.

Schowalter, , T. T., "Mechanics of Secondary Hydrocarbon Migration and Entrapment", AAPG Bulletin, 1979, 63, pp. 723-760.

Smith, D. A., "Theoretical Considerations of Sealing and Non-Sealing Faults", AAPG Bulletin, 1966, 50, pp. 363-374.

Smith, D. A. "Sealing and Nonsealing Faults in Louisiana Gulf Coast Salt Basin", 1980, AAPG Bulletin, 64, pp. 145-172.

Sperrevik, S et al., "Empirical 3stimation of fault rock properties", Norwegian Petroleum Society Special Publication, 2002, 11, pp. 109-125.

Watts, N. L., "Theoretical aspects of cap-rock and fault seals for single- and two-phase hydrocarbon columns", Marine and Petroleum Geology, 1987, 4, pp. 275-307.

Wehr, F. L. et al., "Fault Seal: Contrasts Between the Exploration and Production Problem", In Petroleum Systems of South Atlantic Margins, eds. M.R. Mello and B.J. Katz, AAPG Memoir, 2000, 73, pp. 121-132.

Wilson, P.. et al., "Ranking and selecting fault models using flow-indicator fault properties and simple streamline simulations", Petroleum Geoscience, 2021, 27, 14 pages.

Yielding, G. et al., "Quantitative Fault Seal Prediction", AAPG Bulletin, 1997, 81 (2), pp. 897-917.

Yielding, G. et al., "Fault seal calibration: a brief review", Geological Society, London, Special Publications, 2010, 347, pp. 243-255.

Zijlstra, E. B. et al., "Incorporation of fault properties into production simulation models of permian reservoirs from the southern North Sea", Geological Society, London, Special Publications, 2007, 292(1), pp. 295-308.

* cited by examiner

System 100

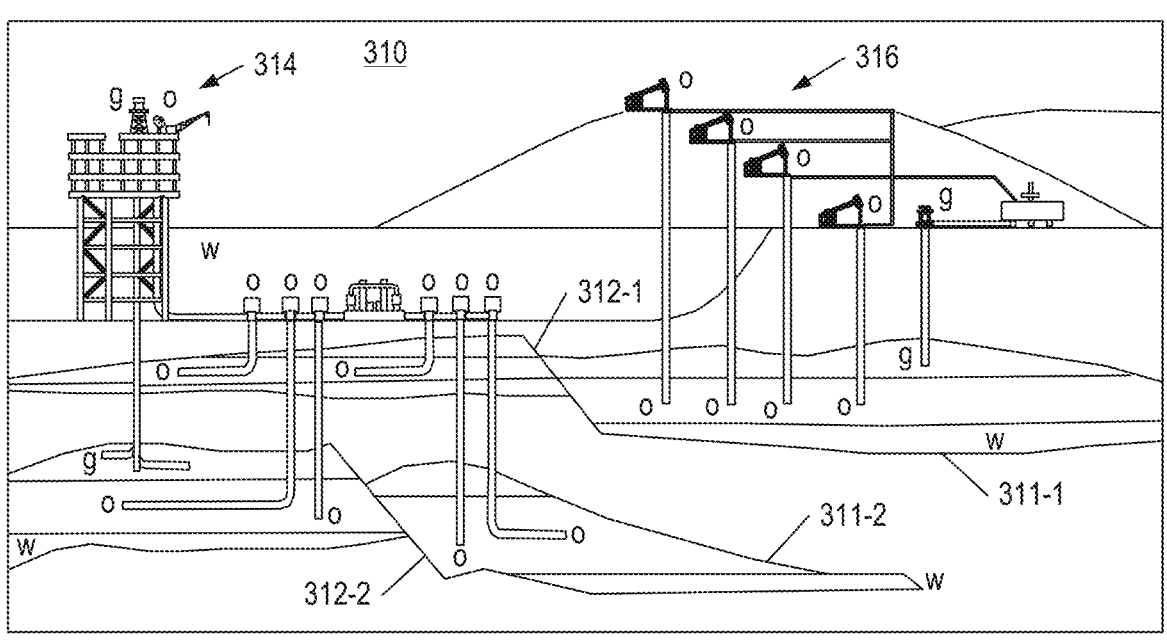
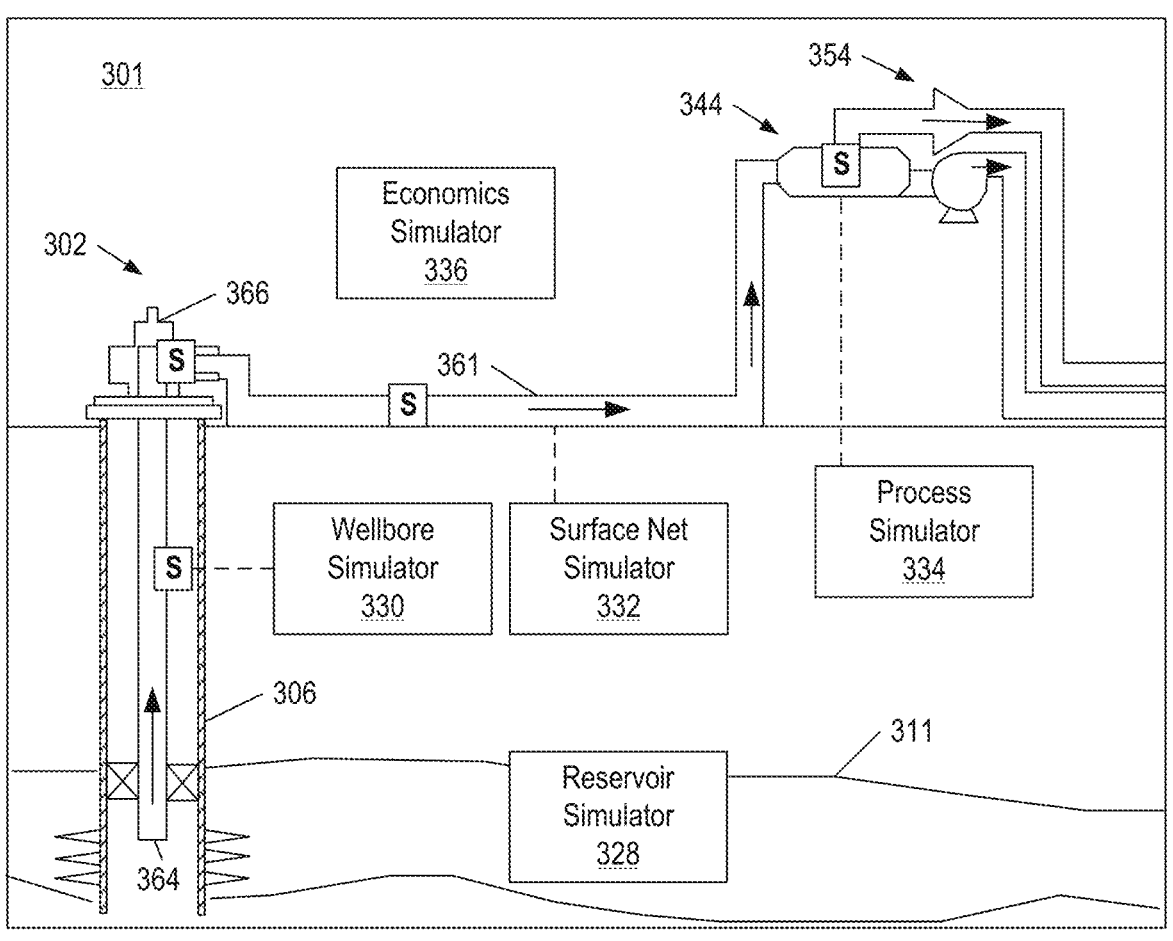
FIG. 3

Free Water Level - Multilayer Perceptron Model (ESGR)

Free Water Level - Multilayer Perceptron Model (SGR)

1800

FIG. 19

Method 2100

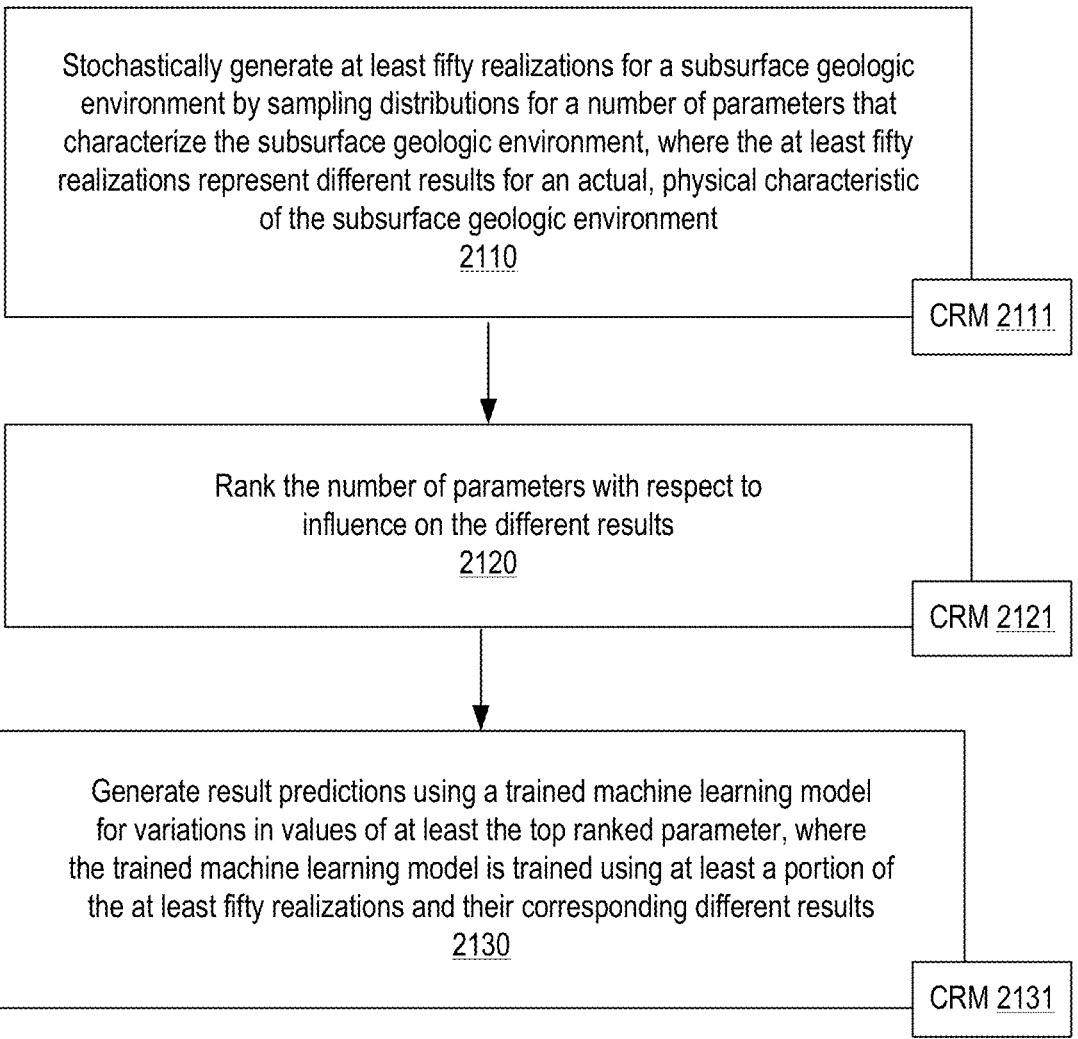

Stochastically generate at least fifty realizations for a subsurface geologic environment by sampling distributions for a number of parameters that characterize the subsurface geologic environment, where the at least fifty realizations represent different results for an actual, physical characteristic of the subsurface geologic environment
2110

CRM 2111

Rank the number of parameters with respect to influence on the different results
2120

CRM 2121

Generate result predictions using a trained machine learning model for variations in values of at least the top ranked parameter, where the trained machine learning model is trained using at least a portion of the at least fifty realizations and their corresponding different results
2130

CRM 2131

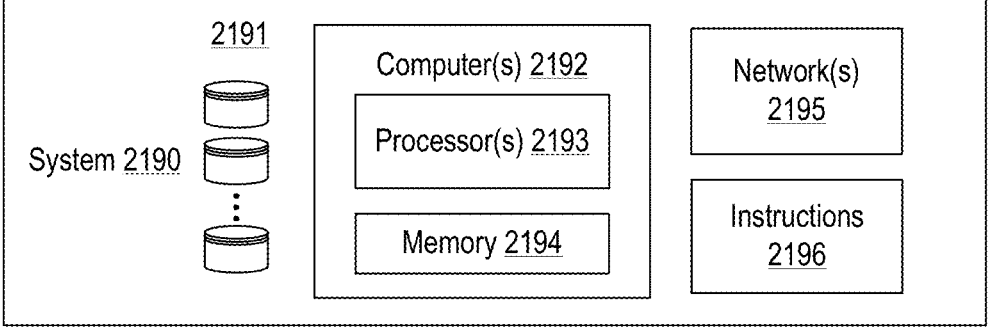

System 2190

2191

Computer(s) 2192

Processor(s) 2193

Memory 2194

Network(s) 2195

Instructions 2196

FIG. 21

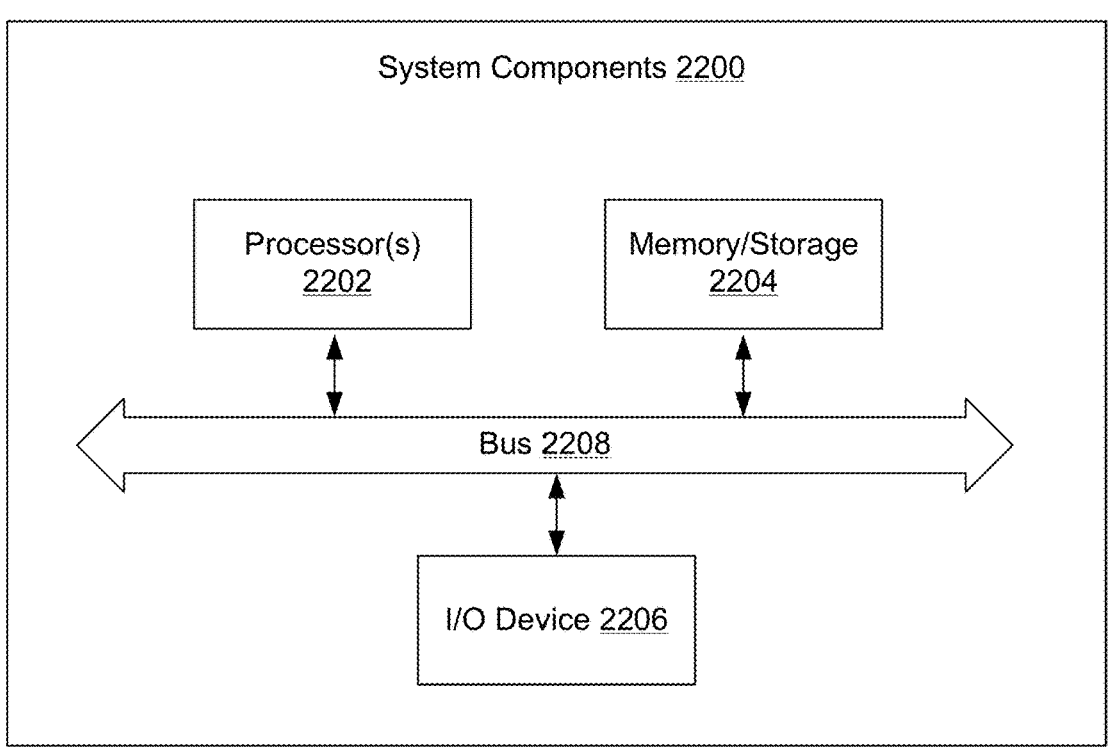
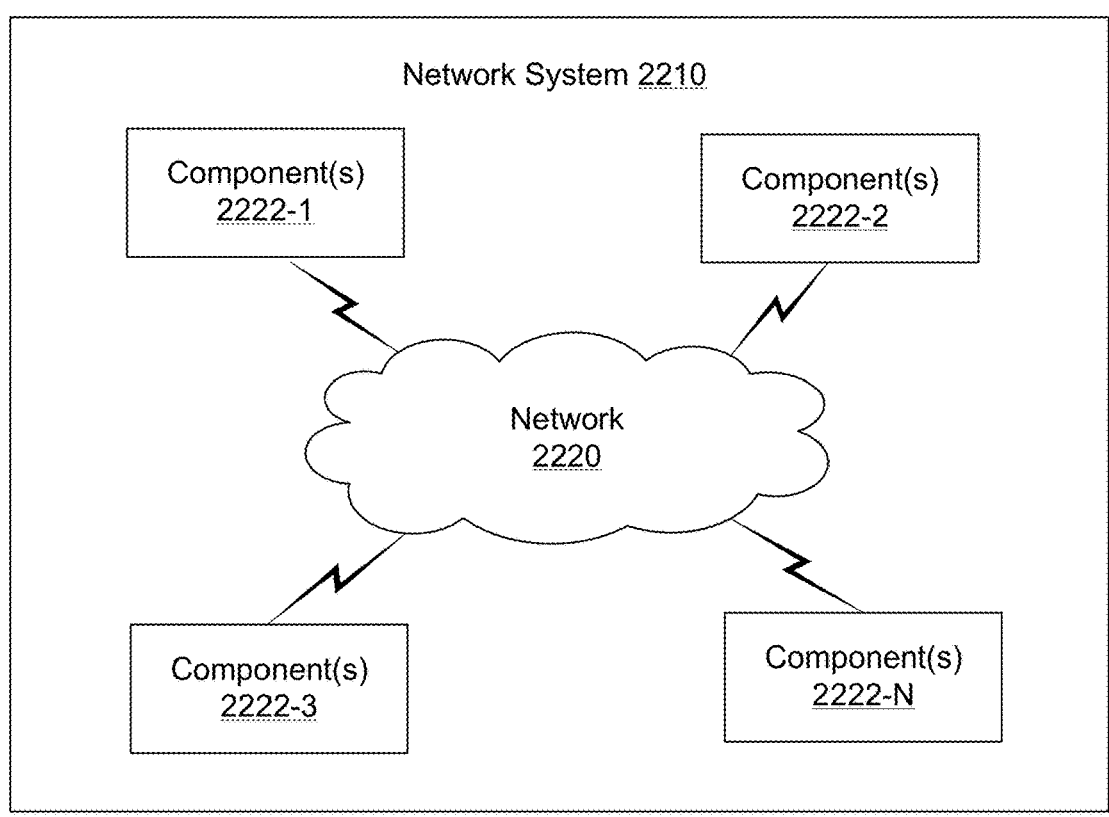
FIG. 22

GEOLOGIC FAULT SEAL CHARACTERIZATION

RELATED APPLICATIONS

This application claims priority to and the benefit of a US Provisional application having Ser. No. 63/395,146, filed 4 Aug. 2022, which is incorporated by reference herein in its entirety.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.).

In oil and gas exploration, interpretation is a process that involves analysis of data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc., where fluid may be produced via the borehole (e.g., as a completed well, etc.). As an example, one or more workflows may be performed using one or more computational frameworks and/or one or more pieces of equipment that include features for one or more of analysis, acquisition, model building, control, etc., for exploration, interpretation, drilling, fracturing, production, etc.

SUMMARY

A method can include stochastically generating at least fifty realizations for a subsurface geologic environment by sampling distributions for a number of parameters that characterize the subsurface geologic environment, where the at least fifty realizations represent different results for an actual, physical characteristic of the subsurface geologic environment; ranking the number of parameters with respect to influence on the different results; and generating result predictions using a trained machine learning model for variations in values of at least the top ranked parameter, wherein the trained machine learning model is trained using at least a portion of the at least fifty realizations and their corresponding different results. A system can include a processor; a memory accessible by the processor; processor-executable instructions stored in the memory and executable to instruct the system to: stochastically generate at least fifty realizations for a subsurface geologic environment by sampling distributions for a number of parameters that characterize the subsurface geologic environment, where the at least fifty realizations represent different results for an actual, physical characteristic of the subsurface geologic environment; rank the number of parameters with respect to influence on the different results; and generate result predictions using a trained machine learning model for variations in values of at least the top ranked parameter, where the trained machine learning model is trained using at least a portion of the at least fifty realizations and their corresponding different results.

One or more non-transitory computer-readable storage media can include computer-executable instructions executable to instruct a computing system to: stochastically generate at least fifty realizations for a subsurface geologic environment by sampling distributions for a number of parameters that characterize the subsurface geologic environment, where the at least fifty realizations represent different results for an actual, physical characteristic of the subsurface geologic environment; rank the number of parameters with respect to influence on the different results; and generate result predictions using a trained machine learning model for variations in values of at least the top ranked parameter, where the trained machine learning model is trained using at least a portion of the at least fifty realizations and their corresponding different results.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 3 illustrates an example of a system;

FIG. 19 illustrates examples of graphs;

FIG. 21 illustrates an example of a method and an example of a system; and

FIG. 22 illustrates example components of a system and a networked system.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
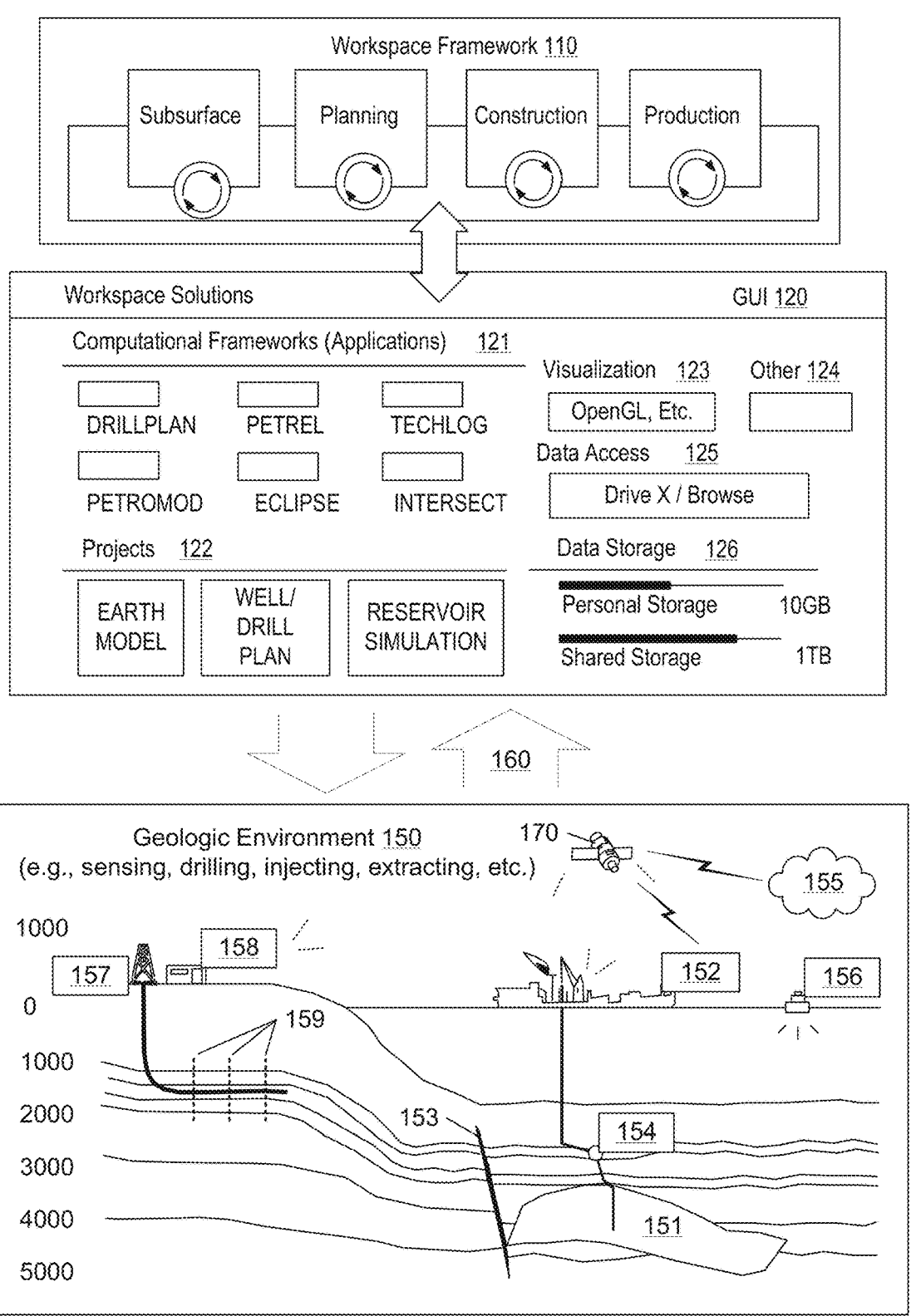
FIG. 1 illustrates an example of a geologic environment and an example of a system.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite 170 in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, and INTERSECT frameworks (SLB, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive exploration and production (E&P) environment (SLB, Houston, Texas), referred to as the DELFI environment, for utilization in geosciences and geoengineering, for example, to analyze subsurface data from exploration to production of fluid from a reservoir.

The DELFI environment is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, machine learning models, etc.).

The TECHLOG framework can handle and process field and laboratory data for a variety of geologic environments (e.g., deepwater exploration, shale, etc.). The TECHLOG framework can structure wellbore data for analyses, planning, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (chemical EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI environment, for example, for rapid simulation of multiple concurrent cases. For example, a workflow may utilize one or more of the DELFI environment on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

While several simulators are illustrated in the example of FIG. 1, one or more other simulators may be utilized, additionally or alternatively. For example, consider the VISAGE geomechanics simulator (SLB, Houston Texas) or the PIPESIM network simulator (SLB, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, CO2 disposal, etc. The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (SLB, Houston, Texas).

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As an example, a model may be a simulated version of an environment, which may include one or more sites of possible emissions. As an example, a simulator may include features for simulating physical phenomena in an environment based at least in part on a model or models. A simulator, such as a weather simulator, can simulate fluid flow in an environment based at least in part on a model that can be generated via a framework that receives satellite data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model (e.g., of the Earth, the atmosphere, the oceans, etc.).

Phenomena associated with a sedimentary basin (e.g., a subsurface region, whether below a ground surface, water surface, etc.) may be modeled using various equations (e.g., stress, fluid flow, phase, etc.). As an example, a numerical model of a basin may find use for understanding various processes related to exploration and production of natural resources (e.g., estimating reserves in place, drilling wells, forecasting production, controlling fracturing, etc.).

For application of a numerical technique, equations may be discretized using nodes, cells, etc. For example, a numerical technique such as the finite difference method can include discretizing a differential heat equation for temperature with respect to a spatial coordinate or spatial coordinates to approximate temperature derivatives (e.g., first order, second order, etc.). While temperature is mentioned, the finite difference method can be utilized for one or more of various variables (e.g., pressure, fluid flow, stress, strain, etc.). Further, where time is of interest, a derivative of a variable or variables with respect to time may be provided.

As to a spatial coordinate, a numerical technique may rely on a spatial grid that includes various nodes where one or more variables such as, for example, temperature, pressure, fluid velocity, etc., can be provided for the nodes upon solving appropriate equations (e.g., subject to boundary conditions, generation terms, etc.). Such an example may apply to multiple dimensions in space (e.g., where discretization is applied to the multiple dimensions). Thus, a grid may discretize a volume of interest (VOI) into elementary elements (e.g., cells or grid blocks) that may be assigned or associated with properties (e.g. porosity, permeability, rock type, etc.), which may be germane to simulation of physical processes (e.g., temperature, pressure, fluid flow, fracturing, reservoir compaction, etc.).

As another example of a numerical technique, consider the finite element method where space may be represented by one dimensional or multidimensional "elements". For one spatial dimension, an element may be represented by two nodes positioned along a spatial coordinate. For multiple spatial dimensions, an element may include any number of nodes. Further, some equations may be represented by the total number nodes while others are represented by fewer than the total number of nodes (e.g., consider an example for the Navier-Stokes equations where fewer than the total number of nodes represent pressure). The finite element method may include providing nodes that can define triangular elements (e.g., tetrahedra in 3D, higher order simplexes in multidimensional spaces, etc.) or quadrilateral elements (e.g., hexahedra or pyramids in 3D, etc.), or polygonal elements (e.g., prisms in 3D, etc.). Such elements, as defined by corresponding nodes of a grid, may be referred to as grid cells.

Yet another example of a numerical technique is the finite volume method. For the finite volume method, values for model equation variables may be calculated at discrete places on a grid, for example, a node of the grid that includes a "finite volume" surrounding it. The finite volume method may apply the divergence theorem for evaluation of fluxes at surfaces of each finite volume such that flux entering a given finite volume equals that leaving to one or more adjacent finite volumes (e.g., to adhere to conservation laws). For the finite volume method, nodes of a grid may define grid cells.

Where a sedimentary basin (e.g., subsurface region) includes various types of features (e.g., stratigraphic layers, fractures, faults, etc.), nodes, cells, etc., may represent, or be assigned to, such features. In turn, discretized equations may better represent the sedimentary basin and its features. As an example, a structured grid that can represent a sedimentary basin and its features, when compared to an unstructured grid, may allow for more simulations runs, more model complexity, less computational resource demands, less computation time, etc. In various examples, a structured approach and/or an unstructured approach may be utilized.

Figure 2:
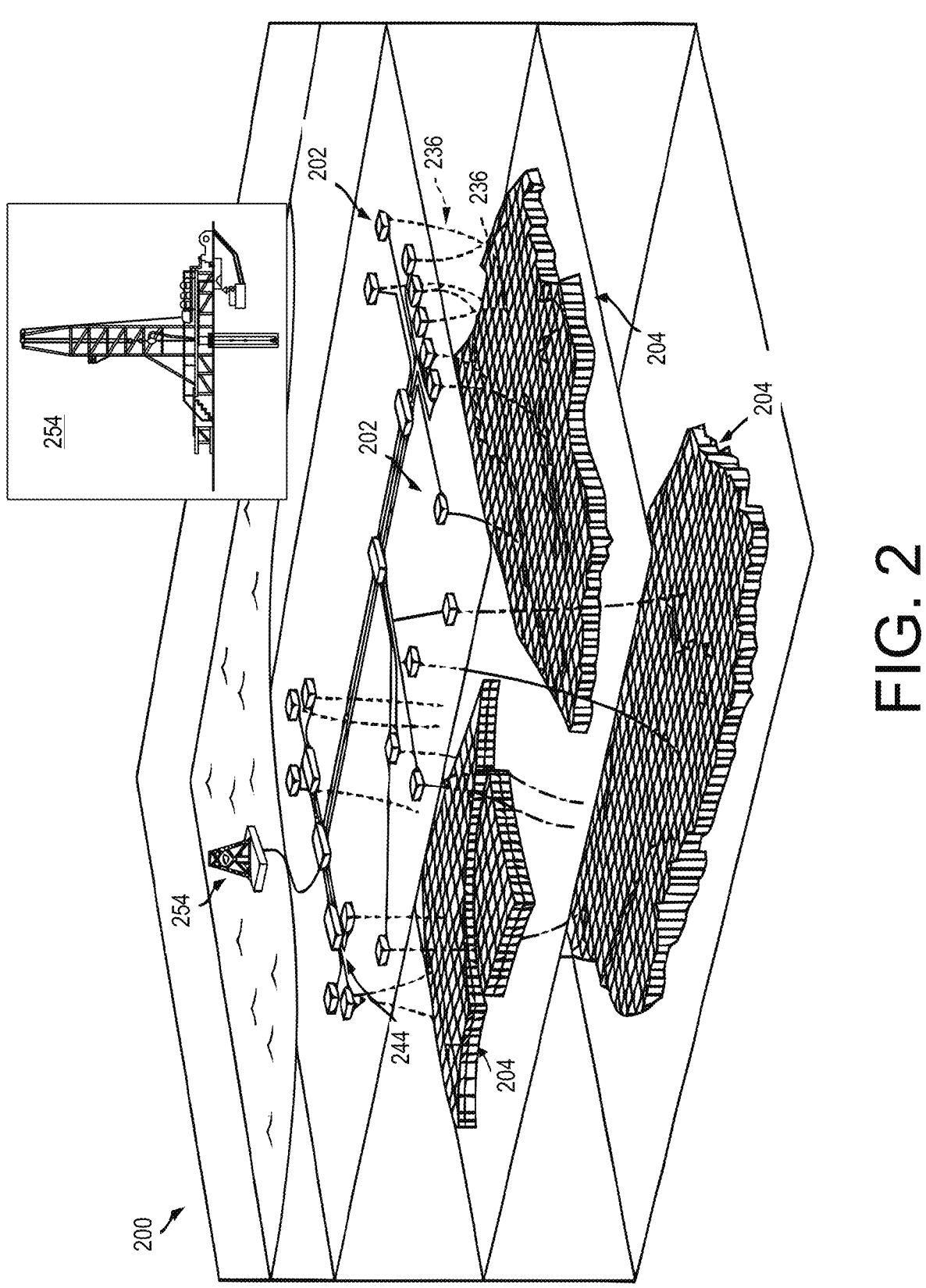
FIG. 2 illustrates an example of a system.

FIG. 2 shows an example of a geologic environment 200 as including various types of equipment and features. As shown, the geologic environment 200 includes a plurality of wellsites 202, which may be operatively connected to a processing facility. In the example of FIG. 2, individual wellsites 202 can include equipment that can form individual wellbores 236. Such wellbores can extend through subterranean formations including one or more reservoirs 204. Such reservoirs 204 can include fluids, such as hydrocarbons. As an example, wellsites can provide for flow of fluid from one or more reservoirs and pass them to one or more processing facilities via one or more surface networks 244. As an example, a surface network can include tubing and control mechanisms for controlling flow of fluids from a wellsite to a processing facility. In the example of FIG. 2, a rig 254 is shown, which may be an offshore rig or an onshore rig. As an example, a rig can be utilized to drill a borehole that can be completed to be a wellbore where the wellbore can be in fluid communication with a reservoir such that fluid may be produced from the reservoir.

As mentioned, the geologic environment 200 can include various types of equipment and features. As an example, consider one or more sensors that can be located within the geologic environment 200 for purposes of sensing physical phenomena (e.g., pressure, temperature, flow rates, composition, density, viscosity, solids, flare character, compaction, etc.). As an example, equipment may include production equipment such as a choke valve where individual wells may each include a choke valve that can regulate flow of fluid from a well. As an example, equipment may include artificial lift equipment that can facilitate production of fluid from a reservoir. Artificial lift can be implemented as part of a production strategy whereby energy can be added to fluid to help initiate and/or improve production. Artificial lift equipment may utilize one or more of various operating principles, which can include, for example, rod pumping, gas lift, electric submersible pumps, etc. Referring again to FIG. 2, the operational decision block may include planning for artificial lift, call for artificial lift, controlling one or more artificial lift operations, etc.

As an example, enhanced oil recovery (EOR) may be employed in the geologic environment 200, which may be based on one or more outputs of a system such as the system 100, etc. EOR can aim to alter fluid properties, particularly properties of hydrocarbons. As an example, EOR may aim to restore formation pressure and/or improve oil displacement or fluid flow in a reservoir. EOR may include chemical flooding (e.g., alkaline flooding or micellar-polymer flooding), miscible displacement (e.g., carbon dioxide injection or hydrocarbon injection), thermal recovery (e.g., steam flood or in-situ combustion), etc. EOR may depend on factors such as reservoir temperature, pressure, depth, net pay, permeability, residual oil and water saturations, porosity and fluid properties such as oil API gravity and viscosity. EOR may be referred to at times as improved oil recovery or tertiary recovery.

FIG. 3 shows an example of portion of a geologic environment 301 and an example of a larger portion of a geologic environment 310. As shown, a geologic environment can include one or more reservoirs 311-1 and 311-2, which may be faulted by faults 312-1 and 312-2 and which may include oil (o), gas (g) and/or water (w). FIG. 3 also shows some examples of offshore equipment 314 for oil and gas operations related to the reservoirs 311-1 and 311-2 and onshore equipment 316 for oil and gas operations related to the reservoir 311-1. As an example, a system may be implemented for operations associated with one or more of such reservoirs.

As to the geologic environment 301, FIG. 3 shows a schematic view where the geologic environment 301 can include various types of equipment. As shown in FIG. 3, the environment 301 can includes a wellsite 302 and a fluid network 344. In the example of FIG. 3, the wellsite 302 includes a wellbore 306 extending into earth as completed and prepared for production of fluid from a reservoir 311 (e.g., one of the reservoirs 311-1 or 311-2).

In the example of FIG. 3, wellbore production equipment 364 extends from a wellhead 366 of the wellsite 302 and to the reservoir 311 to draw fluid to the surface. As shown, the wellsite 302 is operatively connected to the fluid network 344 via a transport line 361. As indicated by various arrows, fluid can flow from the reservoir 311, through the wellbore 306 and onto the fluid network 344. Fluid can then flow from the fluid network 344, for example, to one or more fluid processing facilities 354.

In the example of FIG. 3, sensors (S) are located, for example, to monitor various parameters during operations. The sensors (S) may measure, for example, pressure, temperature, flowrate, composition, and other parameters of the reservoir, wellbore, gathering network, process facilities and/or other portions of an operation. As an example, the sensors (S) may be operatively connected to a surface unit (e.g., to instruct the sensors to acquire data, to collect data from the sensors, etc.).

In the example of FIG. 3, a surface unit can include computer facilities, such as a memory device, a controller, one or more processors, and a display unit (e.g., for managing data, visualizing results of an analysis, etc.). As an example, data may be collected in the memory device and processed by the processor(s) (e.g., for analysis, etc.). As an example, data may be collected from the sensors (S) and/or by one or more other sources. For example, data may be supplemented by historical data collected from other operations, user inputs, etc. As an example, analyzed data may be used to in a decision making process.

As an example, a transceiver may be provided to allow communications between a surface unit and one or more pieces of equipment in the environment 301. For example, a controller may be used to actuate mechanisms in the environment 301 via the transceiver, optionally based on one or more decisions of a decision making process. In such a manner, equipment in the environment 301 may be selectively adjusted based at least in part on collected data. Such adjustments may be made, for example, automatically based on computer protocol, manually by an operator or both. As an example, one or more well plans may be adjusted (e.g., to select optimum operating conditions, to avoid problems, etc.).

To facilitate data analyses, one or more simulators may be implemented (e.g., optionally via the surface unit or other unit, system, etc.). As an example, data fed into one or more simulators may be historical data, real time data or combinations thereof. As an example, simulation through one or more simulators may be repeated or adjusted based on the data received.

In the example of FIG. 3, simulators can include a reservoir simulator 328, a wellbore simulator 330, a surface network simulator 332, a process simulator 334 and an economics simulator 336. As an example, the reservoir simulator 328 may be configured to solve for hydrocarbon flow rate through a reservoir and into one or more wellbores. As an example, the wellbore simulator 330 and surface network simulator 332 may be configured to solve for hydrocarbon flow rate through a wellbore and a surface gathering network of pipelines. As to the process simulator 334, it may be configured to model a processing plant where fluid containing hydrocarbons is separated into its constituent components (e.g., methane, ethane, propane, etc.), for example, and prepared for further distribution (e.g., transport via road, rail, pipe, etc.) and optionally sale. As an example, the economics simulator 336 may be configured to model costs associated with at least part of an operation. For example, consider MERAK framework (SLB, Houston, Texas), which may provide for economic analyses.

As an example, a system can include and/or be operatively coupled to one or more of the simulators 328, 330, 332, 334 and 336 of FIG. 3. As an example, such simulators may be associated with frameworks and/or may be considered tools (see, e.g., the system 100 of FIG. 1, etc.). Various pieces of equipment in the example geologic environments 301 and 310 of FIG. 3 may be operatively coupled to one or more systems, one or more frameworks, etc. As an example, one or more of the sensors (S) may be operatively coupled to one or more networks (e.g., wired and/or wireless) for transmission of data, which, as explained, may include data indicative of production. As shown, a sensor (S) may be utilized for acquisition of downhole data and/or surface data, which can include data relevant to production (e.g., flow rate, temperature, pressure, composition, etc.). Such data may be utilized in a system such as, for example, the system 100 of FIG. 1 for operational decision making, etc.

While various examples of field equipment are illustrated for hydrocarbon related production operations, as explained, field equipment may be for one or more other types of operations where such field equipment can acquire data (e.g., field equipment data) that can be utilized for operation decision making and/or one or more other purposes. As explained, field equipment data may be suitable for use with one or more frameworks, one or more workflows, etc. Uses of field equipment data can involve transfers such as, for example, inter-framework transfers where one or more types of data related issues may arise due to formatting, unit conversions, coordinate reference system (CRS) conversions, etc. Use of field equipment data can be enhanced through automated or semi-automated processes that can perform tasks such as identifying data (e.g., data types, etc.) and/or assessing quality of data.

As an example, a data science approach to uncertainty evaluation can be utilized for fault seal analysis. Such an approach can involve utilization various components that can be part of and/or operatively coupled to one or more frameworks. For example, consider utilization of components in conjunction with the PETREL framework in the DELFI environment where fault seal analysis may be utilized for exploration, planning, execution, production, etc.

Hydrocarbons can accumulate in various subsurface environments. For example, a subsurface environment can include a trap as a configuration of rocks suitable for containing hydrocarbons where the trap is sealed by a relatively impermeable formation. Traps may be described as structural traps (e.g., in deformed strata such as folds and faults) or stratigraphic traps (e.g., in areas where rock types change, such as unconformities, pinch-outs and reefs).

Fault seal analysis can be used to understand the risk of hydrocarbons leaking out of a trap across bounding faults. Inputs to such an analysis can be subject to considerable uncertainty that can be difficult to understand and evaluate. As an example, a data science approach can facilitate uncertainty analysis. For example, consider an automated workflow that runs hundreds of scenarios with stochastically varying input parameters and extracts particular results for each scenario. In such an example, data science techniques combining domain expertise, probability techniques, statistics techniques, and machine learning techniques can be employed to analyze and build models of results to characterize geological faults with respect to sealing ability. In contrast, a non-automated approach that relies on human interpretations may utilize a few scenarios because information from hundreds of scenarios would tend to be overwhelming. In a data science approach that generates at least fifty scenarios, which may optionally increase number of scenarios in an iterative manner, can provide for a wider range of input uncertainties that can be considered. As an example, results of a large number of realizations can be consolidated and visualized in ways that are specific to fault sealing for one or more faults, which can facilitate actions, decisions, etc., to be taken by a geologist. Uncertainty inherent in knowledge of subsurface environments can be explicitly incorporated where the impact of uncertainty can be clearly understood and communicated to decision makers, whether human, machine or human and machine.

As an example, a method can include performing a fault seal analysis stochastically in a manner that leverages capabilities of a computational framework such as, for example, the PETREL framework, which includes a workflow editor. As an example, at least fifty runs can be executed. In various examples, hundreds of runs or even thousands of runs may be executed. As an example, runs can be executed using a sampling technique that may aim to ensure good coverage of one or more parameter spaces. Some examples of sampling techniques include random sampling, Latin hypercube sampling (LHS) and orthogonal sampling. In random sampling new sample points are generated without taking into account previously generated sample points where one does not necessarily need to know beforehand how many sample points to be generated. In the LHS technique, knowledge of number of sample points can be decided in advance where, for each sample point, a data structure can record in which row and column the sample point was taken. Such a configuration can be akin to N rooks on a chess board without threatening each other. In orthogonal sampling, a sample space can be divided into equally probable subspaces where sample points can be selected simultaneously where a total set of sample points can be a Latin hypercube sample (LHS) and that each subspace is sampled with a common density. Orthogonal sampling can help to ensure that a set of random numbers tends to be representative of the real variability, LHS helps to ensure that a set of random numbers can be representative of the real variability whereas random sampling can be a set of random numbers without particular guarantees.

As an example, each scenario or run can provide results that can include, for example, elevation of the highest sand-sand cross-fault juxtaposition (e.g., giving an indication of juxtaposition sealing potential) and predicted free water level (FWL) that could be supported by a fault (e.g., giving an indication of capillary membrane sealing potential). Such results can be automatically extracted and written to a data structure (e.g., memory) at the end of each run. Histograms of the results can then be generated and rendered to a display, if desired, to illustrate fault seal risk and uncertainty for a prospect being analyzed.

A prospect can be an area of exploration in which hydrocarbons have been predicted to exist in economic quantity (e.g., energy expended by equipment and other operations compared to energy produced by hydrocarbons). A prospect can be an anomaly, such as a geologic structure or a seismic amplitude anomaly, that is recommended by explorationists for drilling a well to acquire additional data. Justification for drilling a prospect is made by assembling evidence for an active petroleum system, or reasonable probability of encountering reservoir-quality rock, a trap of sufficient size, adequate sealing rock, and appropriate conditions for generation and migration of hydrocarbons to fill the trap. A group of prospects of a similar nature can constitute a play. Where one or more faults exist, a sealing analysis can assess fault sealing capabilities.

As mentioned, a method can include performing a number of runs in a stochastic manner using one or more sampling techniques. A stochastic workflow can generate large amounts that can be difficult for a human to analyze (e.g. a geologist may be ill-equipped to able to review hundreds or even thousands of fault properties). As an example, a computational framework can execute code, which may be in the form of scripts to process data generated from many runs. For example, one or more PYTHON scripts can be used to calculate summary statistics across fault properties across runs (e.g., realizations). In such an example, median, P10 and P90 for fault sealing capacity values may be generated. As an example, index properties may be generated illustrating, for example, likelihood of a particular fault face representing a sand-sand juxtaposition that is at high risk of cross-fault hydrocarbon leakage. Through processing of runs, a computational framework may identify one or more high-risk areas of a fault and determine which area or areas have high uncertainty (e.g., above a threshold, etc.). In such an example, one or more graphical user interfaces (GUIs) may be rendered to a display where a user or users may identify one or more high-risk areas of a fault based on statistics, etc. As an example, various scripts may be provided that can be used, for example, in standalone processing and/or deployed as PYTHON notebooks in the DELFI environment.

As an example, run generated data can be processed and utilized to train one or more machine learning (ML) models. For example, machine learning techniques can be applied to identify highly influential input parameters for a given fault seal problem. In such an example, an ML model may provide for visualization of how variation in inputs influences fault seal prediction. As an example, various techniques can be implemented through code, which can include scripts such as, for example, PYTHON scripts, which may be used as standalone scripts and/or deployed as notebooks within the DELFI environment.

As explained, a method can provide a data science approach to uncertainty evaluation in fault-seal analysis. In such an example, the method can characterize a formation that includes a fault. Such a characterization can provide for understanding a fault and surrounding formation as subsurface objects that, in general, cannot be readily seen by human eyes. To assess subsurface objects, one or more imaging modalities may be utilized and/or drilling operations, which can include drilling into a faulted region. As to imaging modalities, consider seismic imaging where a seismic survey may be performed on land and/or at sea (e.g., marine seismic). A seismic survey may cover hundreds of square kilometers where seismic energy is emitted by one or more sources, reflected by one or more subsurface structures and received by one or more sensors. Seismic surveys do not tell a complete story and may be affected by noise, ability to illuminate, geobodies, etc. Seismic survey data in combination with physics and knowledge of different types of rocks (e.g., lithology) can provide for an improved understanding;

however, in various instances, with considerable uncertainty. Hence, exploration operations may not be definitive in their results due to uncertainty introduced via one or more factors (e.g., ability to acquire data, noise in data, types of environments, presence of certain geobodies, etc.). As to a fault's sealing ability, various types of uncertainty can and do exist.

As explained, a fault-seal analysis can be used to understand the risk of hydrocarbons leaking out of a trap across bounding faults. There is a broad standard industry workflow for such an analysis in clastic rocks involving building a structural framework of particular seismic horizons (e.g., reflectors) and faults, estimating clay content of the stratigraphy, predicting fault clay content using an algorithm such as shale gouge ratio (SGR), converting the predicted clay content to capillary threshold pressure, and calculating sealing capacity using the reservoir fluid properties. Inputs to such an analysis tend to be subject to considerable uncertainty, which itself can be difficult to understand and evaluate. One approach can involve creating "end member" scenarios to evaluate impact of particular uncertainties. However, an end member approach tends to provide an incomplete picture, where a limited number of scenarios can be run and analyzed in time available to an individual.

As explained, a data science approach can provide for improved uncertainty analysis for fault sealing problems through performing a number of runs greater than fifty, processing results from the runs to generate processed results and training one or more ML models, which can include prediction models, based on results from the runs and/or processed results. As an example, a method can be automated, optionally with a control loop that can process additional runs if such additional runs may contribute to improved uncertainty characterization for fault sealing. For example, a loop can operate in an iterative manner whereby a base number of runs are performed and assessed and one or more additional batches of runs are performed in a manner that depends on assessment of the prior runs. In such an example, an assessment may include assessing performance of one or more ML models. For example, with insufficient data, an ML model may be over-fit and unable to provide predictions for a desired range of inputs. In such an example, additional data can be generated by performing one or more additional runs that may provide for output of a trained ML model that is not so over-fit. In such an approach, a method can include outputting one or more optimized ML models that can be trained ML models suitable for use by one or more humans, machines, etc., to characterize a geologic fault with respect to its sealing ability.

As explained, a method can include performing hundreds of runs for different scenarios having stochastically varying input parameters where data science techniques can be used to analyze and build models such that, for example, a wider range of input uncertainties can be considered where results of a large number of realizations can be consolidated and visualized in ways that are specific to a problem being addressed (e.g., and useful to a geologist tasked with such an analysis). As mentioned, uncertainty inherent a fault seal analysis can be explicitly incorporated into a process where the impact of the uncertainty can be more clearly understood and communicated to decision makers, whether human and/or machine. While various examples are described with respect to fault sealing, a method can be utilized to address one or more other geological analyses where uncertainty is an issue.

An aim of fault-seal analysis in exploration prospects can be to understand the risk of insufficient hydrocarbons remaining in a defined trap because of leakage across prospect-bounding faults. Where insufficient hydrocarbons remain, the amount of energy input to reach and produce such hydrocarbons may be greater than the energy potential of such hydrocarbons. In general, a prospect becomes more economical, energy-wise, where the amount of hydrocarbons that can be produced is considerable and substantial. In some instances, a reservoir of trapped hydrocarbons can produce those hydrocarbons for decades.

Figure 4:
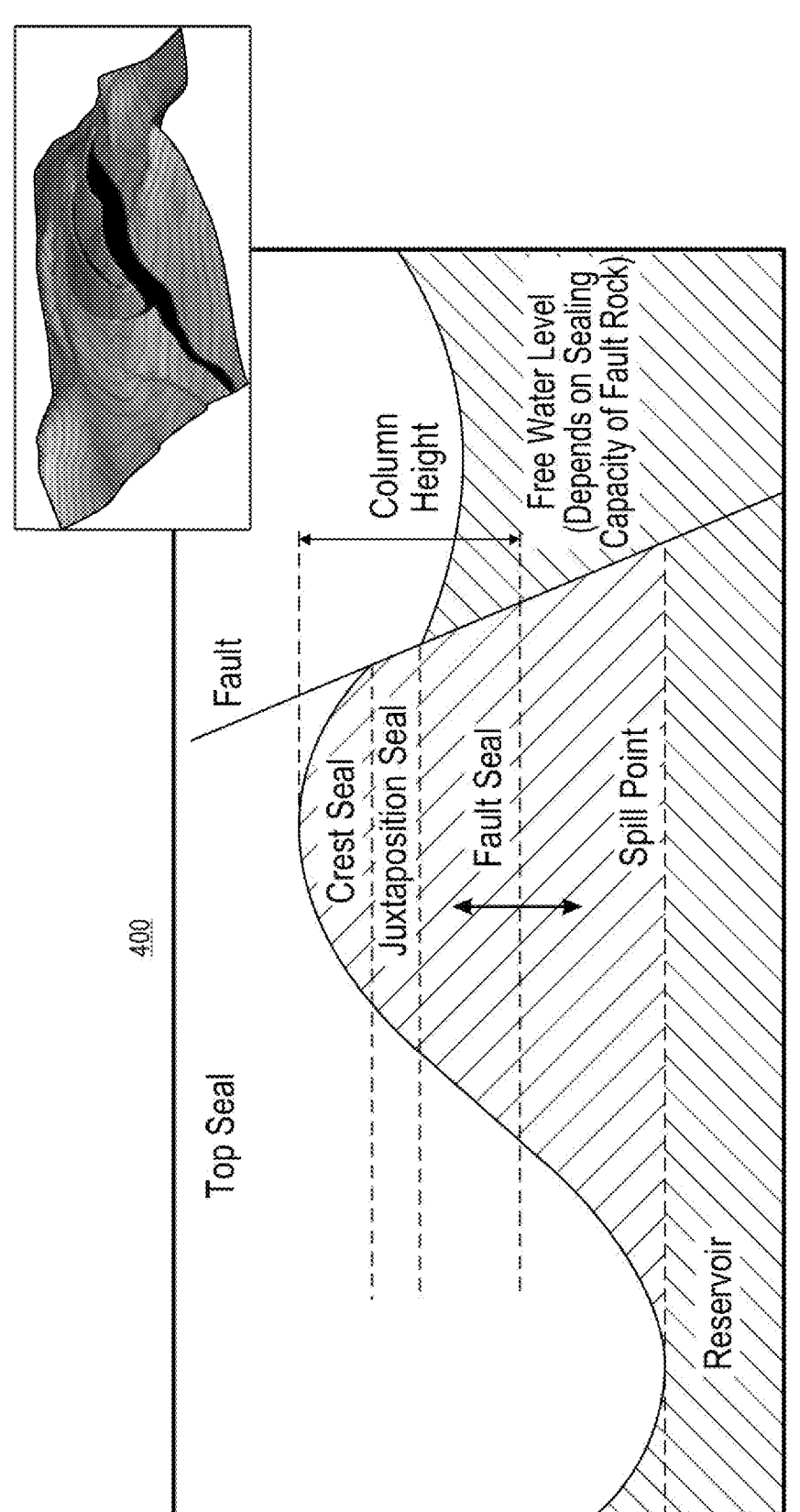
FIG. 4 illustrates an example of a graphic of a subsurface geologic environment.

FIG. 4 shows an example of a graphic 400 as a cross-sectional slice of a subsurface, three-dimensional region. Analysis of fault-seal potential can involve various elements (see, e.g., Knipe et al. 1997; Jones and Hillis 2003; Bretan et al. 2011). One element is the trap geometry: the type of closure, spill points and potential fault-bound compartments (see, e.g., James et al. 2004; Corona et al. 2010). Another element is the crossfault juxtapositions along the fault: where reservoir is juxtaposed against a sealing lithology such as shale across a fault there is likely to be juxtaposition seal and where reservoir is juxtaposed against reservoir there is risk of crossfault leakage of hydrocarbons out of the trap (see, e.g., Smith 1966; Allan 1989; Knipe 1992). Yet another element is potential for fault membrane seal: where fault rock within the fault zone (for example, a fault gouge or shale smear) has capillary properties such that hydrocarbon migration across the fault is prevented (see, e.g., Hubbert 1953; Smith 1966; 1980; Schowalter 1979; Watts 1987; Brown 2003).

Specifically, FIG. 4 shows a cross-section of a generic fault-bound trap illustrating risk elements typically considered in fault-seal analysis. In the graphic 400, "crest seal" refers to the four-way dip closure part of the trap where fault seal is not a factor; "juxtaposition seal" refers to the part of the trap where reservoir is juxtaposed against a sealing lithology (in this case the topseal) across the fault; "fault seal" (or membrane seal) refers to the part of the trap where reservoir is juxtaposed against reservoir, and sealing capacity is dependent on the capillary properties of the fault rock (e.g., clay gouge or shale smear); and structural spill point and fault-bound compartments may also be considered.

As shown in the example graphic 400 of FIG. 4, an analysis can characterize one or more of a free water level (FWL), a column height and the structural spill point. Such features can depend on gravity, for example, where the acceleration of gravity is vertical in the graphic 400 of FIG. 4 the column height can be a vertical column height that can be specified according to a true vertical depth (TVD). In various examples, buoyancy, phases (e.g., oil, water, gas, etc.), thermal effects, etc., may be taken into account. For example, consider gas rising, which may cause movement of water and/or oil.

An industry workflow for conducting a fault-seal analysis on an exploration prospect can include various actions such as: (i) interpreting key faults and horizons from 3D seismic reflection data; (ii) building a 3D geocellular model of the target prospect, incorporating the interpreted faults and horizons and a grid property estimating the clay content (VClay) of the host rocks; (iii) estimating fault clay content using industry-standard techniques based on host rock clay content and fault throw, such as SGR (see, e.g., Yielding et al. 1997) and shale smear factor (SSF) (see, e.g., Lindsay et al. 1993); (iv) transforming the predicted fault clay content to capillary threshold pressure; (v) identifying key crossfault juxtaposition windows where reservoir sandstone is juxtaposed against sandstone, creating a risk of crossfault hydrocarbon leakage; and (vi) mapping key fault properties on the sandstone-sandstone juxtaposition windows identified. In such a workflow, the predicted critical leak point across the fault (i.e., the fault face with the highest elevation predicted free-water level (FWL)) can then be identified and the hydrocarbon-brine FWL that could be supported across the fault can be predicted.

As to transforming predicted fault clay content to capillary threshold pressure, one or more techniques may be employed. For example, consider direct laboratory measurements of capillary threshold pressure from fault rocks available in core or field analogs, using databases or applying relationships available in the published literature (see, e.g., Sperrevik et al. 2002, Bretan et al. 2003, Yielding et al. 2010). The capillary threshold pressure can then be converted to fault-sealing capacity in meters of hydrocarbon column with a knowledge of the reservoir fluid properties (hydrocarbon and brine density; hydrocarbon-water contact angle, and interfacial tension).

As explained, a fault seal analysis workflow can be subject to a large number of uncertainties in inputs, including structural framework (seismically defined fault and horizon interpretation (see, e.g., Childs et al. 1997)), facies distribution and petrophysical model (see, e.g., Clarke et al. 2006), clay content prediction techniques (see, e.g., Yielding et al. 1997; Freeman et al. 2010; Lindsay et al. 1993), transformation of predicted clay content to capillary threshold pressure (see, e.g., Sperrevik et al. 2002; Bretan et al. 2003; Yielding et al. 2010), and fluid properties (see, e.g., Karolyte et al. 2019). Therefore, it is not possible to characterize trap risk with a single value of the predicted FWL that could be supported across the trap-bounding fault(s).

To allow for evaluation of uncertainties and to evaluate uncertainties, as mentioned, a method can include creating a limited number of deterministic "end-member" scenarios (see, e.g., Clarke et al. 2006) to capture the likely range of key inputs, with results being, for example, P10, P50 and P90 fault-seal scenarios. However, this approach will not capture a full range of uncertainty for the inputs that might be quite germane to an analysis, and it can be difficult to realistically map input values to the expected P10, P50 or P90 result a priori. Further, through such an approach, test the uncertainty in reservoir distribution on either side of the fault is problematic (see, e.g., Dee et al. 2007). An alternative approach may be to run many (hundreds or thousands) stochastic realizations that model an appropriate range of inputs (see, e.g., Wehr et al. 2000), producing distributions of predicted reservoir-reservoir juxtaposition elevations and trapping FWLs from which P10, P50 and P90 cases can be identified analytically (see, e.g., James et al. 2004; Freeman et al. 2008; Childs et al. 2009; Corona et al. 2010). Some stochastic studies solely consider the potential for juxtaposition sealing, neglecting the possibility of capillary membrane sealing (see, e.g., James et al. 2004, Corona et al. 2010). The aforementioned stochastic approach tends to be also difficult to apply because it demands some amount of automation to efficiently model the large number of scenarios, and a large quantity of data is produced that can be quite difficult to interpret and summarize in a way that is useful for geoscientists and decision-makers (see, e.g., Freeman et al. 2008).

As explained, a data science approach can leverage results from more than fifty realizations to generate one or more ML models that can include one or more predictive ML models. As mentioned, a data science workflow can be automated, optionally in a manner that can optimize utilization of resources (e.g., computing resources, etc.). By employing automation and data science techniques, an efficient method can run scenarios and analyze the results of a stochastic fault-seal analysis and also generate one or more ML models. In a trial, a data set for a subsurface environment is processed where the subsurface environment happens to span sea level (e.g., elevation zero); noting that subsurface environments analyzed may be entirely below sea level or entirely above sea level.

A method included accessing a data set, specifically the Tynemouth data set, which is a 3D pillar grid-based geocellular model that was created, based on publicly available information, for teaching purposes and for developing and testing fault-seal analysis workflows (see, e.g., Wilson et al. 2021).

Figure 5:
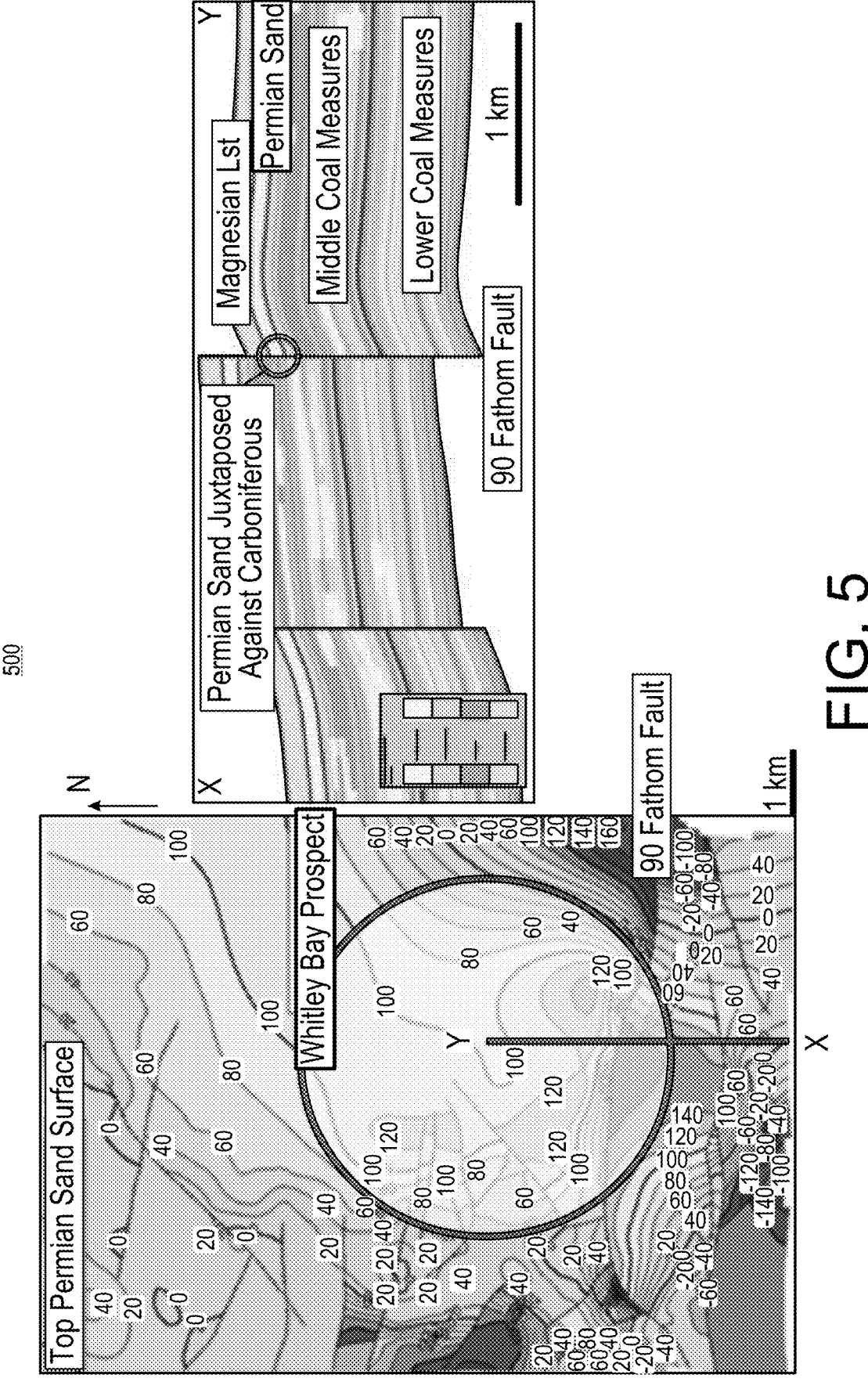
FIG. 5 illustrates examples of graphics of a subsurface geologic environment.

FIG. 5 shows graphical representations 500 of a model based on the geology of the Tynemouth area, onshore northeast England with grid-cell dimensions of approximately 100 m×100 m×2.4 m. The model stratigraphy includes the Carboniferous Lower and Middle Coal Measures, the Permian Yellow Sandstones that form the key reservoir unit in the area (analogous to ROTLIEGENDES Sandstones in the southern North Sea offshore), and Magnesian Limestone (based on the Harton 1 borehole; see, e.g., Ridd et al. 1970). The structural interpretation follows the structure contour map of the Lower-Middle Coal Measures boundary published by Land (1974). Faults are modeled as vertical to simplify the structural model and pillar gridding process; noting that a workflow can be applied to models with one or more inclined faults. The Carboniferous in this area is known to be strongly channelized (see, e.g., O'Mara and Turner 1999), and the population of the grid with a facies property in the Carboniferous model zones has employed object-based modeling to reflect that channelization. A VClay grid property was created using a Gaussian random function simulation with appropriate distributions of values for each facies. As both the facies and petrophysical modeling employed stochastic methods, each model is run with the same input parameters but changing random seed values, which results in a different equiprobable realization of the modeled property. It follows that each model run will result in different equiprobable realizations of the crossfault juxtaposition pattern and fault clay content prediction. Therefore, stratigraphic variability is an uncertainty that can be addressed by a fault-seal analysis.

The Tynemouth data set is utilized to demonstrate how an example method, which may be a workflow, operates in the context of a fault-seal analysis. In particular, the example method is applied to focus on the Whitley Bay prospect, a combined four-way/three-way dip closure trap that is downthrown along the major 90 Fathom Fault as shown in FIG. 5. Permian sandstone on the downthrown side of the fault is juxtaposed against Carboniferous coal measures on the upthrown side. The analysis described here evaluates the crossfault juxtapositions and fault properties along the 90 Fathom Fault. The example method can be implemented to identify the distribution of the highest sandstone-sandstone window elevations and predicted FWLs across a number of realizations (e.g., 250) as stochastically generated.

In FIG. 5, the graphical representations 500 show characteristics of the Tynemouth data set, particularly via a structure map of the Harvey Marine Band (top Middle Coal Measures), based on the map published by Land (1974) along with a cross-section along line X-Y, illustrating the juxtaposition of Permian sandstone against the Carboniferous stratigraphy along the 90 Fathom Fault (with a vertical exaggeration of 3×).

As mentioned, a data science approach can be implemented where a combination of techniques may be utilized.

A workflow can draw on such techniques to run fault-seal analysis realizations, and extract and summarize usable insights from the results.

As explained, a method can involve: automation of fault-seal analysis processes; analysis of the resulting suites of fault properties; and application of machine learning techniques to build one or more predictive models and, for example, visualizations of how FWL predicted by the analysis varies across an input parameter space.

As to automation of fault-seal analysis processes, as mentioned, stochastics may be utilized to vary inputs, including facies model and numerical inputs to the fault-seal analysis. As mentioned, Latin hypercube sampling may be used to select the numerical input parameters so that coverage of the parameter space is maximized. Outputs for each run can be elevations of the highest sandstone-sandstone juxtaposition window and the highest predicted FWL for sandstone-sandstone juxtapositions. In an example using the Tynemouth data set, an analysis is run 250 times and the inputs and outputs for each realization are recorded (e.g., stored in a data structure). Such a process can then compute fault properties for each realization, which can be retained for further analysis.

As to analysis of resulting suites of fault properties, as mentioned, suitable code, scripts, etc., may be implemented to generate summary fault property statistics across the realizations (e.g., median, P10, P90, interquartile range). As an example, one or more custom fault properties can be used to inform a fault-seal analysis (e.g., sandstone-sandstone juxtaposition probability, probability of SGR<20%).

As to application of machine learning techniques, one or more libraries, frameworks, etc., may be implemented to generate one or more ML models. As an example, an ensemble approach may be utilized where an ensemble can be of similar types of models and/or different types of models. As mentioned, a method can include generating predictive models and can include visualizing how FWL predicted by an analysis varies across one or more portions of an input parameter space.

As an example, the number of realizations can be set by a user to reflect the computer resources available, size of a model (e.g., how many cells and fault faces), and amount of time available to run the analysis. As mentioned, a method may be automated to commence with a certain number of runs, which may be based on one or more factors, and then to increase runs, if appropriate, until statistics, probabilities, model predictions, etc., are sufficient. As to the Tynemouth data set, 250 realizations were run.

As an example, an automated fault-seal analysis runs each of the following processes for each realization:

a. Stochastic facies and petrophysical modeling processes can be rerun with different random seed values for each realization to allow for the impact of stratigraphic uncertainty to be incorporated into the analysis.

b. Juxtaposition analysis where crossfault juxtaposition windows where sandstone (as defined by the facies model) is juxtaposed against sandstone can be identified and stored to a fault property.

c. Fault clay content prediction where another uncertainty in the analysis pertains to the fault clay content prediction technique that is used. As an example, a technique used in each realization can be randomly selected from various techniques. For example, consider a method that provides for selection of a technique from four possibilities: (i) SGR (see, e.g., Yielding et al. 1997), (ii) effective shale gouge ratio (ESGR; see, e.g., Freeman et al. 2010), (iii) SGR combined with clay smears, assuming critical shale smear factor (see, e.g., Lindsay et al. 1993) of 3 for host rocks with clay content >40%, and (iv) ESGR combined with clay smears using the same assumptions as in (iii). A fault clay content prediction technique selected in each realization can be stored to memory (e.g., a data structure).

d. Estimation of fault rock capillary threshold pressure from the predicted clay content. Such a process may utilized the published relationship of Sperrevik et al. (2002), which demands maximum burial depth and burial depth at the time of faulting to be specified as well as the fault clay content. As an example, burial depth parameters can vary stochastically between realizations. As an example, uniform distributions can be applied with a range of maximum burial depth between 2000 m and 4000 m, and burial depth at the time of faulting between 1000 m and 2000 m. Such values can be selected as appropriate for a prospect being analyzed and uncertainty in the depth estimates. The Sperrevik capillary threshold pressure relationship can be utilized; noting alternatives (see, e.g., Bretan et al. 2003; Yielding et al. 2010). As to the Sperrevik relations, input distributions of the burial depth parameters can be used to obtain a range of predicted fault capillary threshold pressure values for a given clay content (see also Wilson et al. 2021). Burial depth parameters used in each realization can be stored to memory (e.g., written to a data structure).

e. Conversion of capillary threshold pressure to sealing capacity (e.g., in meters of hydrocarbon column) based on fluid properties. As an example, water density can be assumed to be constant at 1115 $kgm^{-3}$. Other fluid properties may be varied stochastically between realizations, for example, with uniform distributions. As an example, hydrocarbon density can be varied between approximately 400 $kgm^{-3}$ and approximately 800 $kgm^-$3, hydrocarbon-water contact angle between approximately 0 degrees and approximately 30 degrees, and interfacial tension between approximately 20 $dynecm^{-1}$ and approximately 40 $dynecm^{-1}$. Fluid properties used in each realization can be stored to memory (e.g., written to a data structure). A predicted FWL fault property can be created by subtracting sealing capacity from elevation for each fault face along the 90 Fathom Fault of the Tynemouth data set.

f. Extraction of the elevation of the highest relevant sandstone-sandstone juxtaposition window and highest-elevation FWL where Permian sandstone is juxtaposed against Carboniferous sandstone along the downthrown side of the 90 Fathom Fault of the Tynemouth data set. Such values can be stored to memory (e.g., written to a data structure).

The foregoing process, which may be automated, can output results, which may not demand further data processing or analysis. For example, a result can be the distribution of the highest sandstone-sandstone juxtaposition window elevations across the 250 realizations run, allowing the risk of hydrocarbon leakage at crossfault sandstone-sandstone juxtaposition windows to be evaluated. As another example, a result can be the distribution of the predicted FWLs across the 250 realizations, allowing the potential for membrane seal to be evaluated.

Figure 6:
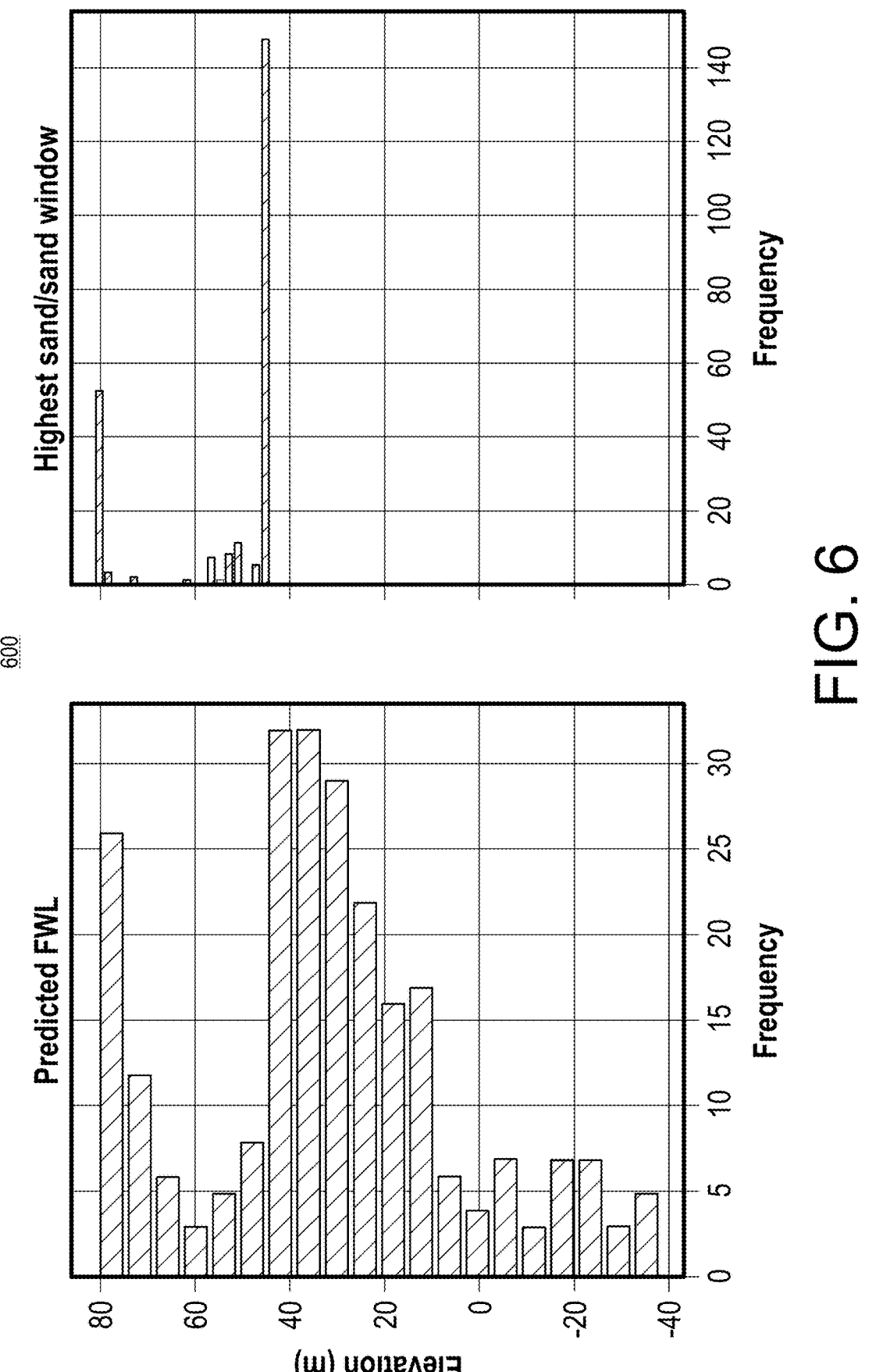
FIG. 6 illustrates an example of a graph.

FIG. 6 shows example plots 600 of distributions of results for the Whitley Bay prospect; note that as the Tynemouth model is based on onshore data, the values are both above and below sea level (e.g., −40 m to +80 m). Particular crossfault sandstone-sandstone juxtaposition windows can occur at approximately 80 m, close to the maximum elevation of the top of Permian sandstone cutoff on the downthrown side of the 90 Fathom Fault, and at approximately 45 m, with relatively few values in between those two extremes. This is also reflected in the predicted FWL distribution, with a bimodal distribution that has frequency peaks just below 80 m and just below 45 m. These results indicate there is a risk of low volumes in the trap where sandstone-sandstone juxtaposition windows occur near the trap crest, but it is more likely that the trap is filled down to 40 m elevation or below.

In a data science approach, as mentioned, the amount of data and the number of different fault properties generated can be quite large. For example, potentially thousands of different fault properties can be generated (e.g., juxtaposition properties, fault clay content prediction, mercury-air and in-situ capillary threshold pressure, sealing capacity, predicted FWL for each realization) and it is realistically not possible for a geologist to view and evaluate these and provide usable results (see, e.g., Freeman et al. 2008). As an example, a method can provide one or more processes that can facilitate summarizing and optionally visualizing information contained in generated fault properties. As mentioned, a code, which may be a script, may be utilized to compute fault property summary statistics and index fault properties from fault properties created in an automated workflow.

Figure 7:
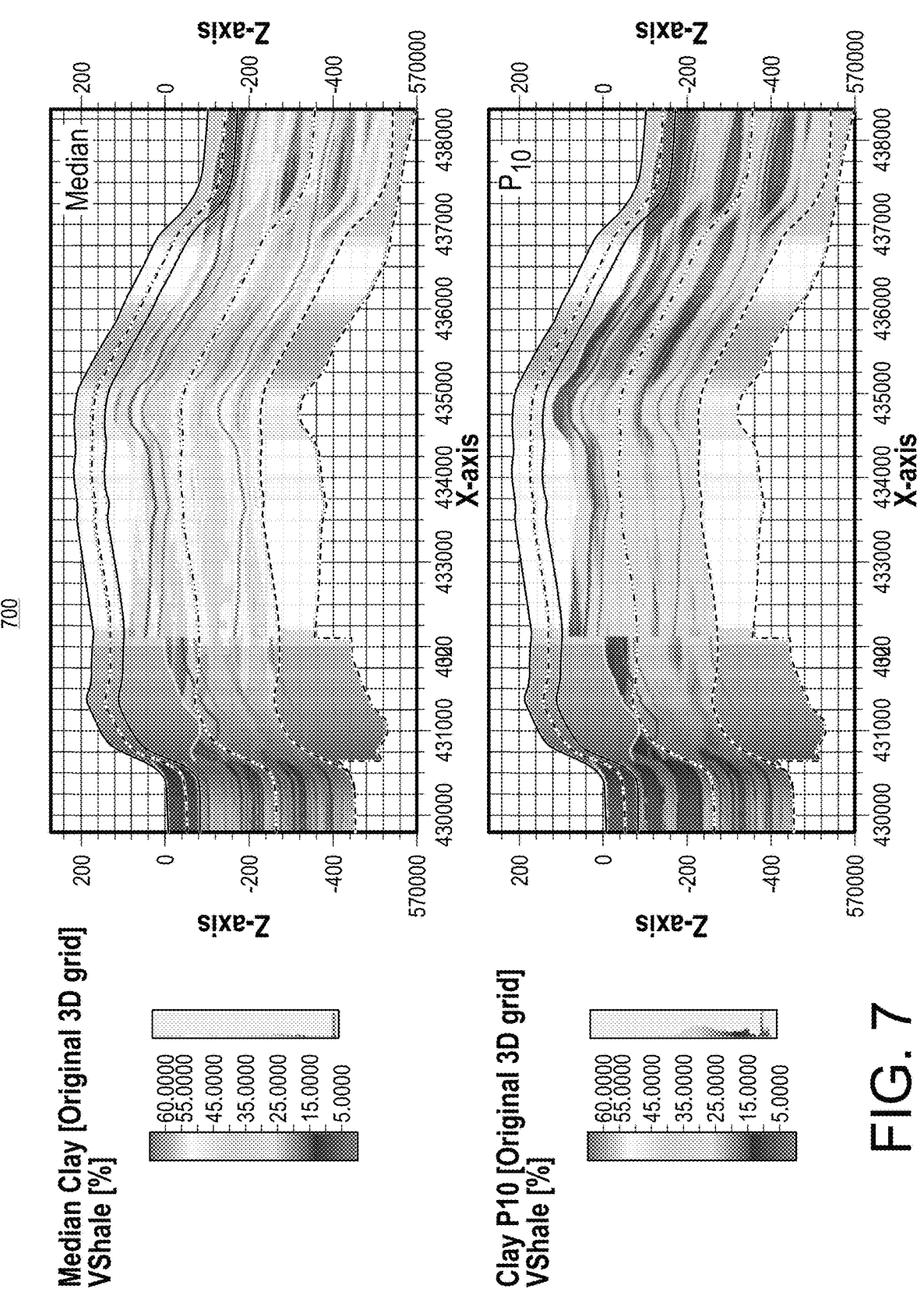
FIG. 7 illustrates examples of graphs.
Figure 8:
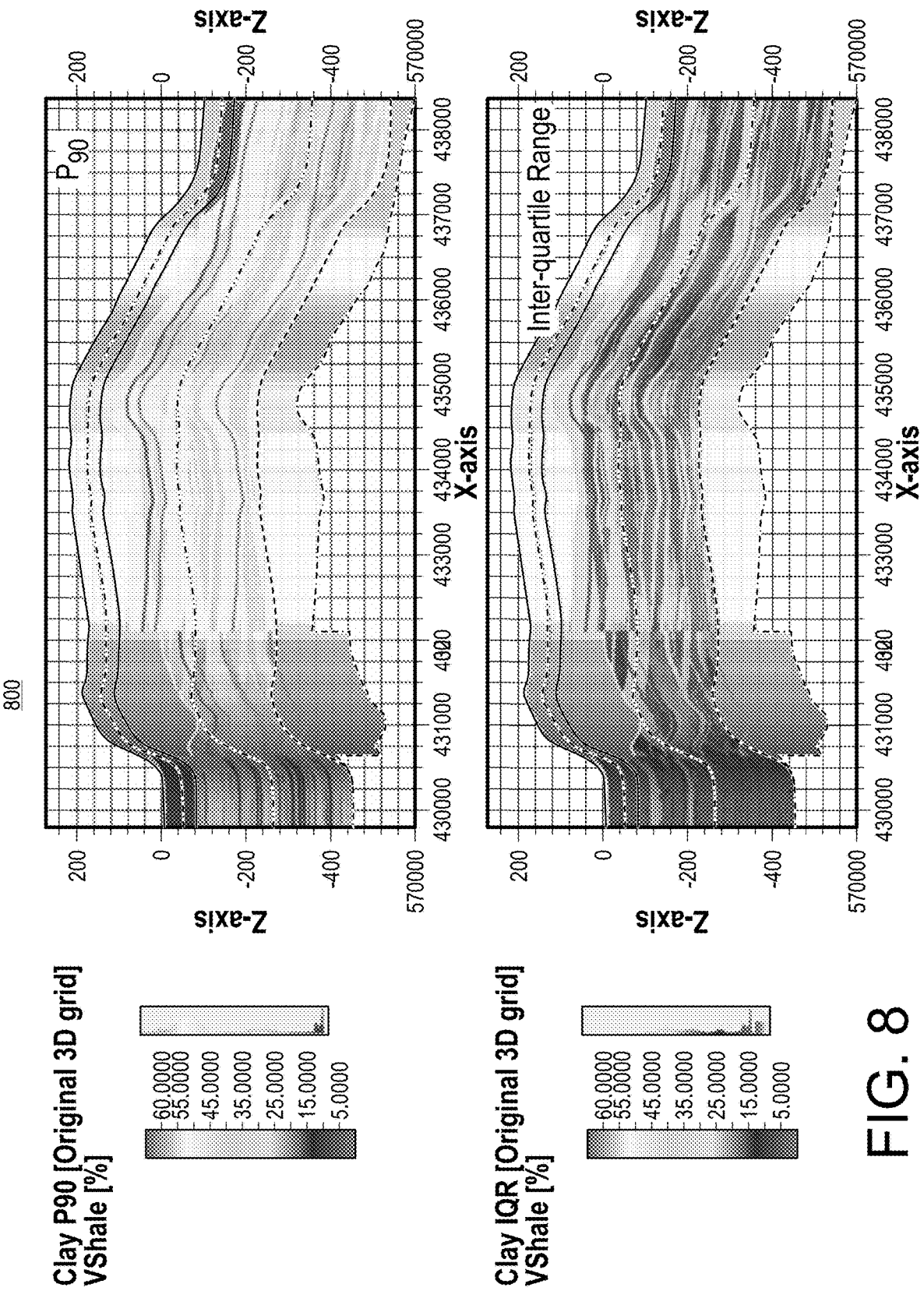
FIG. 8 illustrates examples of graphs.

FIG. 7 and FIG. 8 show example graphics 700 and 800 for fault property summary statistics, specifically median, P90, P10 and interquartile range. A method can include computing summary statistics fault properties over automated realizations or optionally a selected number of realizations. For example, a median fault property can be produced by calculating the median value over 250 realizations of the fault property in question for each fault face along a particular fault or faults. As mentioned, FIG. 7 and FIG. 8 shows median, P90, P10 and interquartile range fault properties computed for the 250 realizations of predicted fault clay content along the 90 Fathom Fault of the Tynemouth data set. In this case, the clay content realizations are derived from variable facies and petrophysical model inputs with different fault clay content prediction algorithms, so the summary statistics give a picture of how those uncertainties influence the variability of the results. The interquartile range can be particularly useful here as it indicates those areas of the fault plane that have the greatest uncertainty in predicted clay content. Similar graphics (e.g., visualizations) can be made for other fault properties.

In the examples of FIG. 7 and FIG. 8, fault property summary statistics for fault clay content prediction across the 250 realizations run in the analysis are shown graphically. The median gives an idea of central tendency, while P10 and P90 show extreme low and high predicted clay contents from the distribution, respectively. The interquartile range can be used to understand which parts of the fault plane show the greatest uncertainty. Through generation of these summary fault properties, a geologist can obtain a greater understanding of the fault property uncertainty than would be possible by inspecting different predicted clay content fault properties computed during an analysis.

Figure 9:
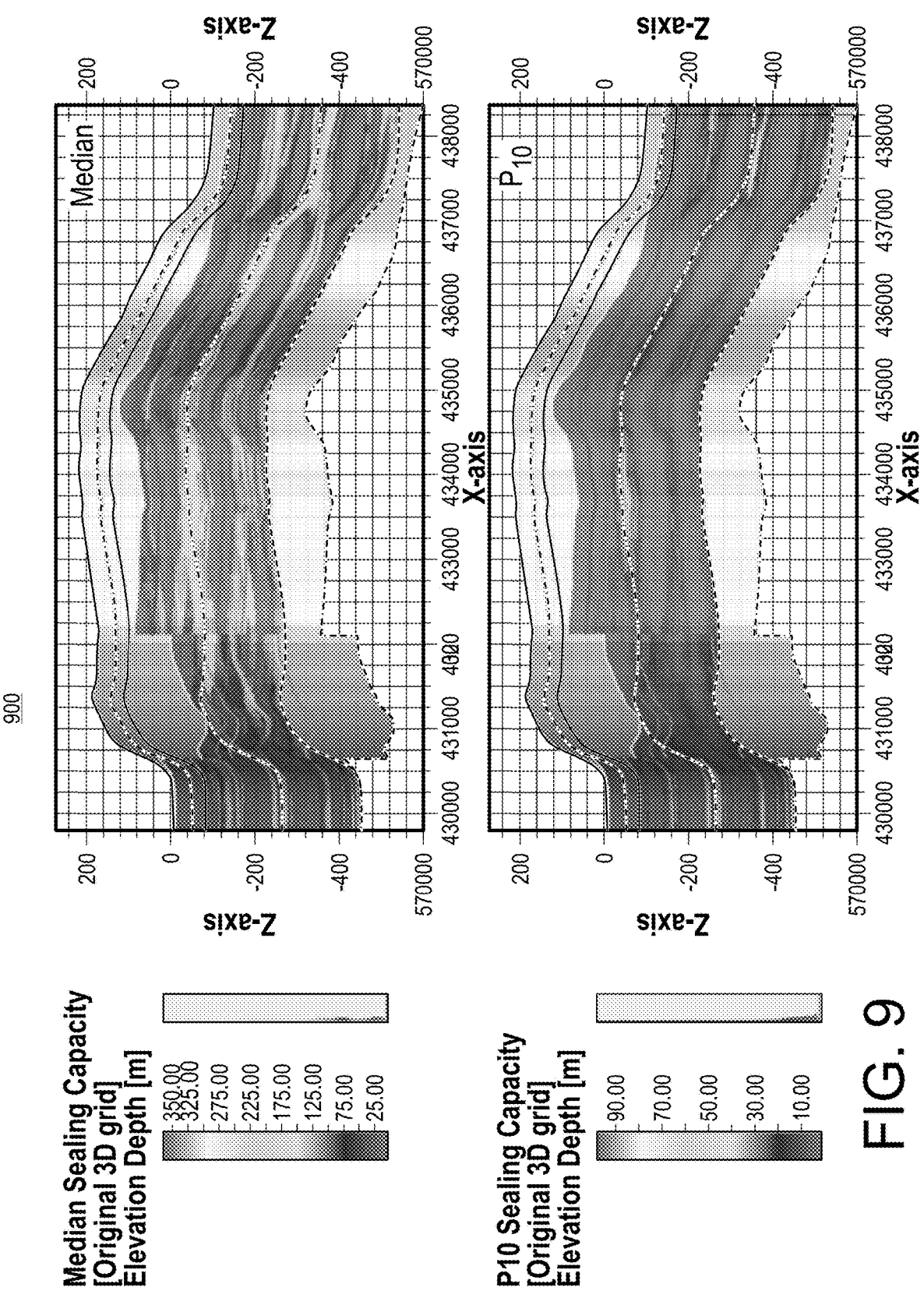
FIG. 9 illustrates examples of graphs.
Figure 10:
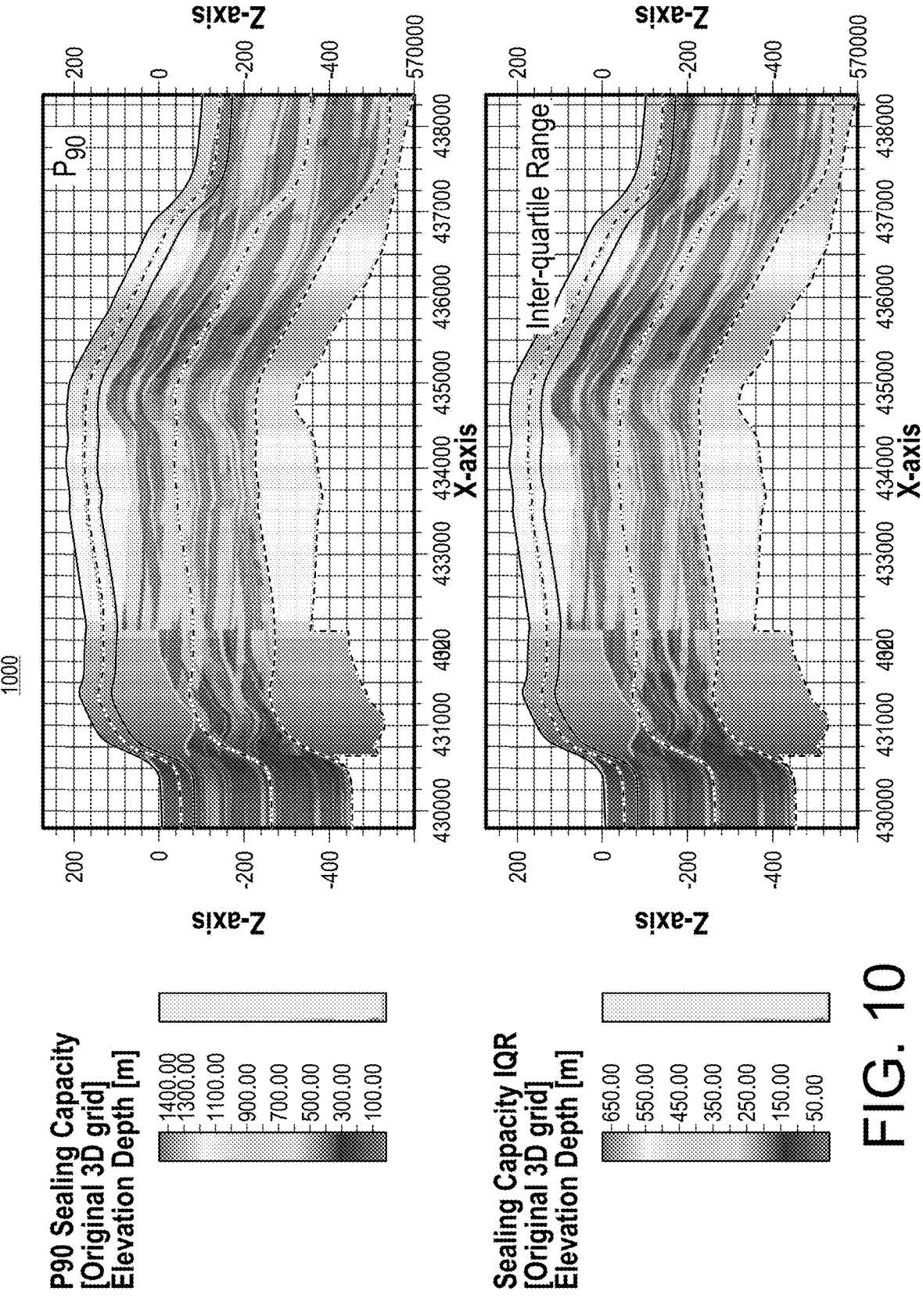
FIG. 10 illustrates examples of graphs.

FIG. 9 and FIG. 10 show example graphics 900 and 1000 for fault-sealing capacity, specifically graphics for median, P90, P10 and interquartile range. The graphics of FIG. 9 and FIG. 10 show fault property summary statistics for sealing capacity across the 250 realizations run in an analysis, akin to fault clay content prediction properties shown in FIG. 7 and FIG. 8.

Figure 11:
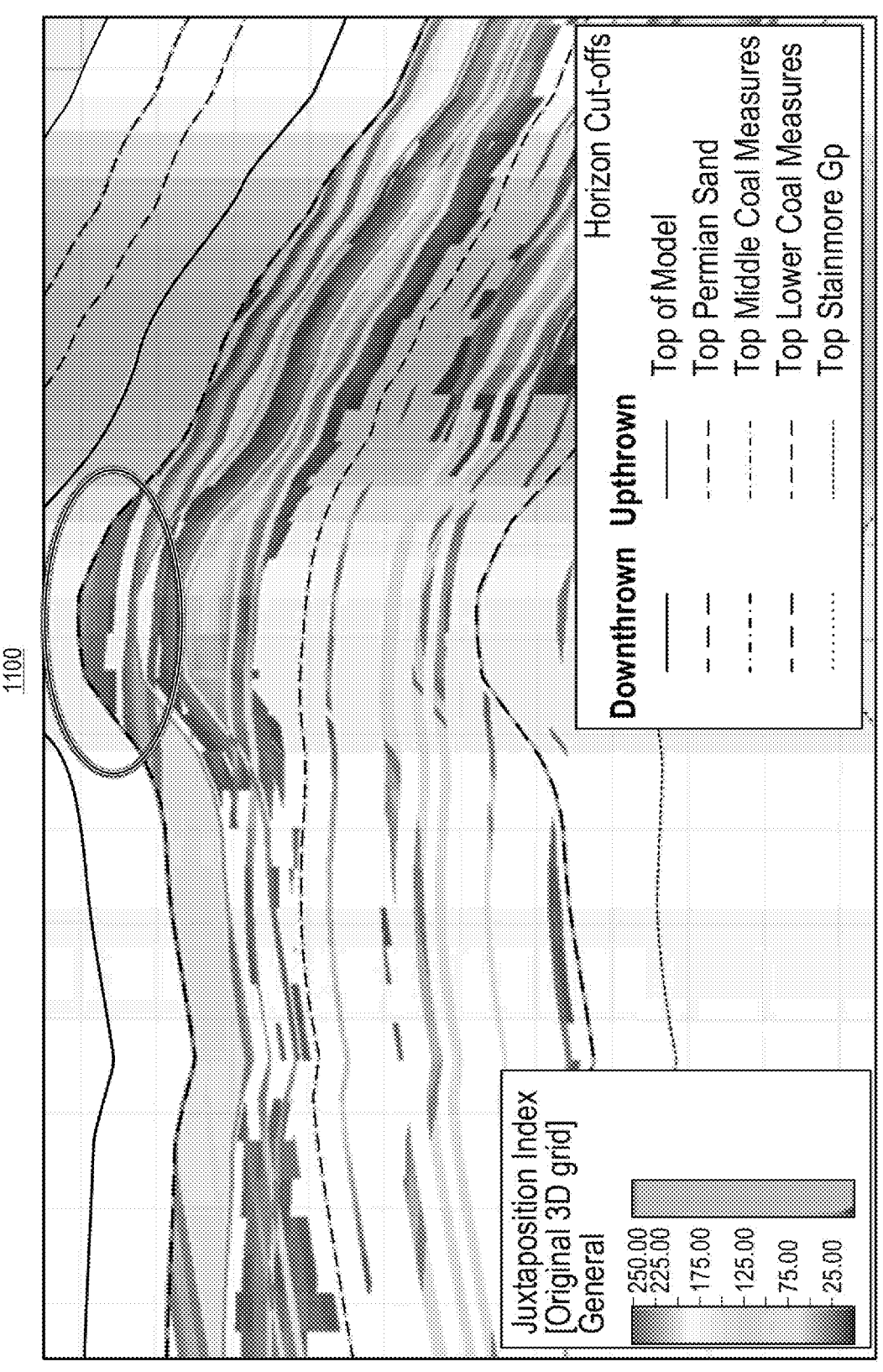
FIG. 11 illustrates an example of a graph.

FIG. 11 shows a graphic 1100 of a crossfault juxtaposition index property for the 90 Fathom Fault. The value of the fault property in this case is the number of realizations (out of 250) that the fault face represents a sandstone-sandstone juxtaposition window for which there is a higher risk of crossfault hydrocarbon flow out of the trap. Where the value is zero (no risk of sandstone-sandstone juxtaposition) the property is set to be undefined. In the graphic 1100, it can be seen that there are fault faces with an approximately 20% chance of representing sandstone-sandstone juxtaposition windows close to the highest elevation of the downthrown Permian sandstones against the fault (highlighted). In FIG. 11, the graphic 1100 is a view to the south with vertical exaggeration 5×.

Figure 12:
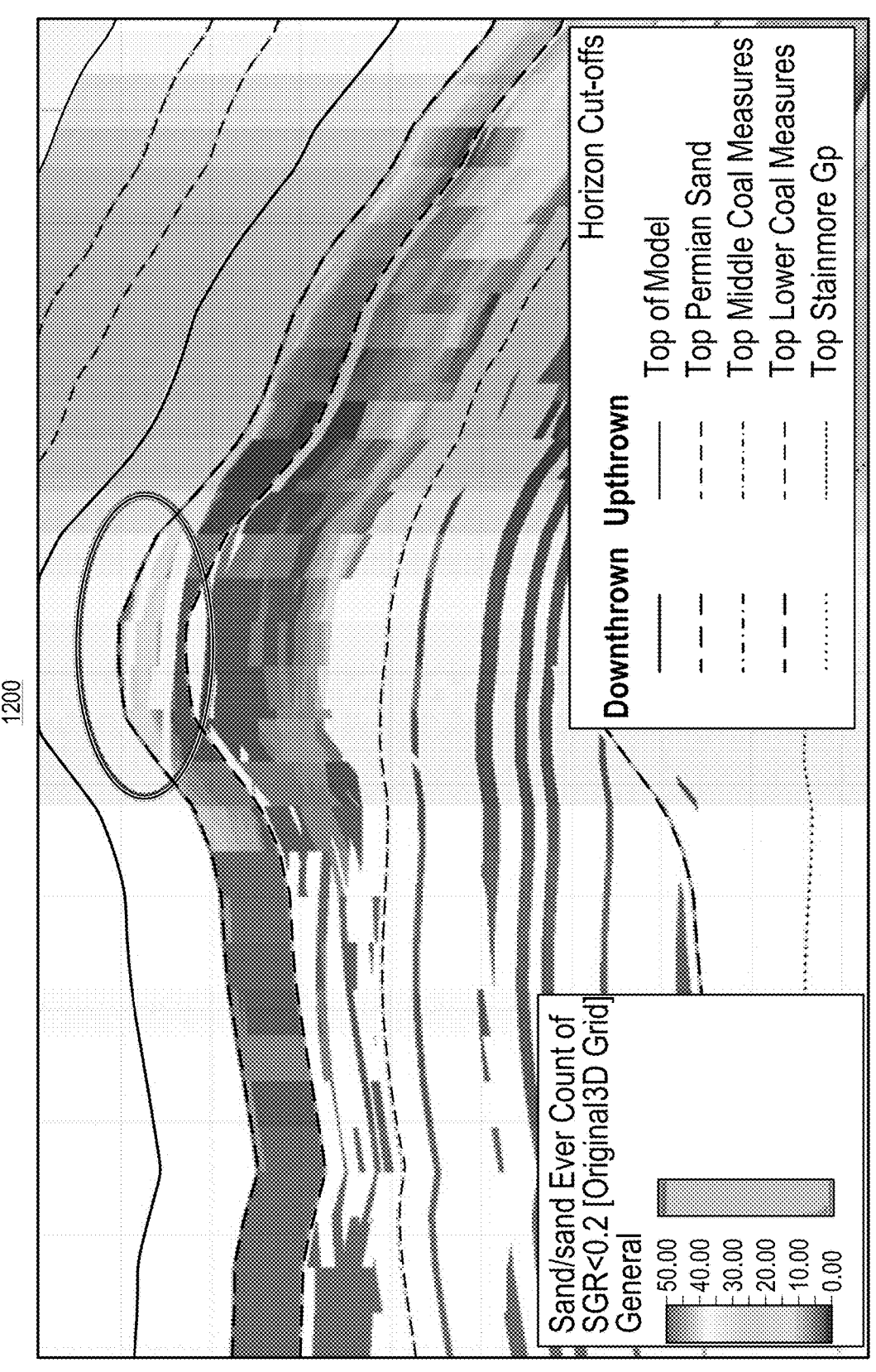
FIG. 12 illustrates an example of a graph.

FIG. 12 shows a graphic 1200 of a fault clay prediction index property for the 90 Fathom Fault. The value of the fault property in this case is the number of realizations (out of 250) that the fault face represents a fault clay content <20%, indicating a risk of crossfault hydrocarbon leakage. Where the value of the juxtaposition index is zero (no risk of sandstone-sandstone juxtaposition) the property is set to be undefined. There are fault faces with an approximately 20% chance of having low predicted clay contents close to highest elevation of the downthrown Permian sandstones against the fault (highlighted). In FIG. 12, the graphic 1200 is a view to the south with vertical exaggeration 5×.

Figure 13:
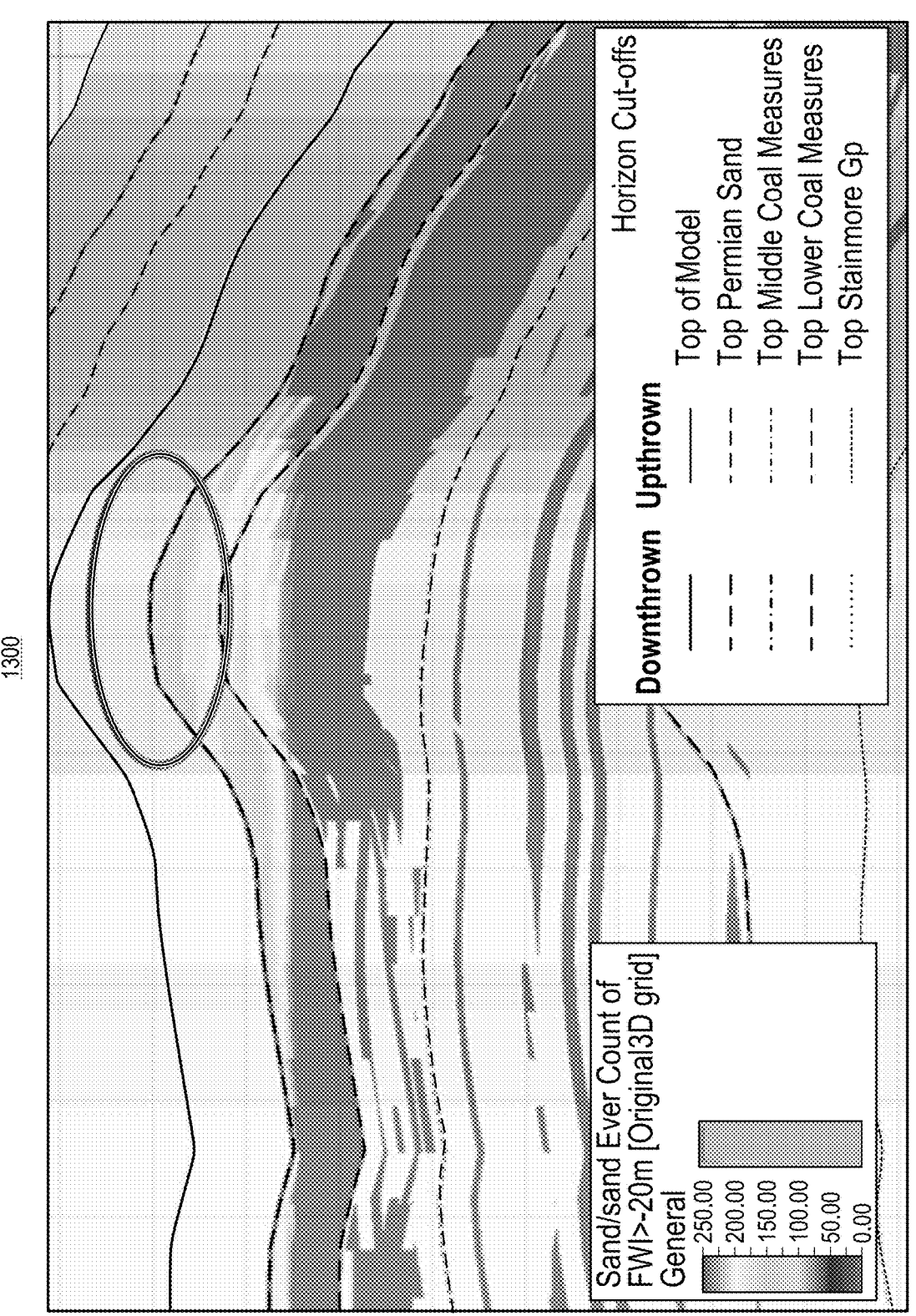
FIG. 13 illustrates an example of a graph.

FIG. 13 shows a graphic 1300 of a predicted FWL index property for the 90 Fathom Fault. The value of the fault property in this case is the number of realizations (out of 250) that the fault face represents a predicted FWL at a higher elevation than −20 m. The graphic 1300, which can be part of a graphical user interface, can be utilized, for example, where it is known that a certain FWL elevation is required for trap volumetrics to be economic (e.g., energy-wise, etc.). Where the value of the juxtaposition index is zero (no risk of sandstone-sandstone juxtaposition) the property can be set to be undefined. In the graphic 1300, there are fault faces with an approximately 40% chance of a high-elevation FWL and (low trap volumes) close to highest elevation of the downthrown Permian sandstones against the fault (highlighted). In FIG. 13, the graphic 1300 is a view to the south with vertical exaggeration 5×.

An index fault property is one where for each fault face the index value is initially set to zero, and then incremented by one for each realization where a certain condition is met. Examples of such conditions include when the fault face represents a crossfault sandstone-sandstone juxtaposition window (see, e.g., FIG. 11), when the predicted clay content exceeds 20% (see, e.g., Yielding et al. 1997, Childs et al. 2009; and FIG. 12), or when the predicted FWL elevation is lower than a specified value that can be tied to the prospect economics (see, e.g., FIG. 13). Such an approach can provide for critical result trap analysis (see, e.g., Freeman et al. 2008). As explained, various property values can be generated in a manner that allows a geologist to evaluate the risk of a condition being met across realizations, which, as explained, may be generated in an automated manner. As an example, if an index fault property indicates that a particular fault face represents a sandstone-sandstone juxtaposition window in 50 out of 250 realizations, that implies a probability of sandstone-sandstone juxtaposition at that fault face of 0.2. Such an approach provides for understanding uncertainty, which as explained, can depend on various factors that can stem from instruments, techniques, etc., to acquire data, modeling frameworks, etc.

As mentioned, in FIG. 11, the fault juxtaposition index property is shown, indicating for how many realizations out of 250 each fault face represents a sandstone-sandstone juxtaposition window that has an elevated risk of crossfault hydrocarbon leakage out of the trap. This number may be expressed as a probability. Where the value is zero (no risk of sandstone-sandstone juxtaposition) the fault property may be set undefined for ease of visualization. In the example, there are fault faces with a potential sandstone-sandstone juxtaposition close to the top of the Permian sandstone cutoff, although these have relatively low probability of occurring (about 5 to 10%). The graphic 1100 of FIG. 11 can be considered alongside the histogram of maximum sandstone-sandstone juxtaposition elevation in FIG. 6.

As explained, in FIG. 12, a fault clay content prediction index property is shown, indicating for how many realizations out of 250 each fault face has a predicted fault clay content of <20%. The property can be set to be undefined where the sandstone-sandstone juxtaposition index property (see, e.g., FIG. 11) is zero, so the fault clay content index is visualized solely where there is a risk of crossfault sandstone-sandstone juxtaposition. Calibration studies (see, e.g., Yielding et al. 1997; Childs et al. 2009) suggest that an SGR value of approximately 0.2 is the lower limit for sealing faults, which may be used in industry fault-seal studies. Fault clay content can be a controlling factor on sealing capacity; however, low clay content fault rocks can have substantial sealing capacity where, for example, catalases and quartz cementation are processes contributing to the fault microstructure (see, e.g., Fisher et al. 2003). In the example of FIG. 12, the graphic 1200 represents an index across fault properties computed using different techniques. Fewer calibration data may be available for techniques other than SGR. In the example of FIG. 12, there are areas high on the fault plane where there is an approximately 20% risk of low predicted clay content values. The highest risk is around the maximum elevation of the top of Permian sandstone cutoff against the fault.

Another use case for an index fault property can assist with a situation where volumetric and economic analyses have indicated a minimum fill level for the trap to be economically viable. In the example of FIG. 13, an elevation of −20 m has been selected as the economic cutoff for the purposes of visualization. Around the trap crest there are areas where the predicted FWL is above −20 m (i.e., the trap is predicted to not be economically viable) in approximately 100 realizations out of 250 (40%). Such an approach can ascertain uncertainty in a manner that can facilitate decision making.

As explained, various examples of fault property summary statistics and various examples of selected index properties for a particular problem being addressed can provide a more nuanced and informative understanding of trap risk compared to an analysis that involves a small number of end-member cases, each selected to address a particular scenario.

As mentioned, a method can involve training one or more machine learning models (ML models), which may involve one or more types of training (e.g., supervised learning, unsupervised learning, a combination of supervised and unsupervised learning, etc.). As an example, learning (e.g., training) can involve accessing data, which may be split into training and testing data, and then training one or more ML models using the training data to generate one or more trained ML models followed by testing the one or more trained ML models using the testing data. In such an approach, various model parameters may be set and/or various hyperparameters set and/or adjusted. In machine learning, model quality can depend on both model parameters and hyperparameters.

As an example, a machine learning framework can include one or more machine learning models. As an example, a multiple linear regression model (MLR model) can be a machine learning model (ML model). As an example, an artificial neural network (ANN) model can be a machine learning model (ML model). As an example, a trained ML model may be implemented for one or more purposes.

As an example, an ML model can be a non-physics-based ML model, a physics-based ML model and/or include one or more physics-based models. As an example, an ML model can be relatively light-weight, which may expedite learning and/or reduce computational resource demand to generate a trained ML model or ML models.

As to types of machine learning models, consider one or more examples such as a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network (CNN), stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model, which may be a machine learning model, may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train an ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, a device and/or distributed devices may utilize TENSORFLOW LITE (TFL) or another type of lightweight framework. For example, one or more pieces of equipment at a wellsite may include and/or utilize a lightweight framework suitable for execution of a machine learning model (e.g., a trained ML model, etc.). TFL is a set of tools that enables on-device machine learning where models may run on mobile, embedded, and IoT devices. TFL is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). TFL provides multiple platform support, covering ANDROID and iOS devices, embedded LINUX, and microcontrollers. TFL provides diverse language support, which includes JAVA, SWIFT, Objective-C, C++, and PYTHON. TFL provides high performance, with hardware acceleration and model optimization. As an example, TFL may provide various machine learning tasks, which may include, for example, data processing, image classification, object detection, pose estimation, question answering, text classification, etc., on multiple platforms.

As an example, given a trained ML model, a method can include receiving input data and making inferences about the input data where the trained ML model has not previously seen the input data (e.g., input data that is not training data). As an example, one or more ML techniques can be utilized to build predictive models, for example, consider one or more ML models that can make predictions as to an expected FWL that can be supported by the 90 Fathom Fault given a set of input values. Through use of one or more predictive ML models, a method can generate output that can facilitate an understanding of which parameters are exerting substantial influence on a predicted FWL. As an example, a method can include generating and rendering one or more graphics that can facilitate an understanding of how uncertainty in particular inputs affect prediction.

As an example, for the fault seal analysis example for the Tynemouth data set, ML model inputs can include one or more of the highest sandstone-sandstone juxtaposition window elevation, maximum burial depth, burial depth at the time of faulting, hydrocarbon density, hydrocarbon-water contact angle, and interfacial tension. In various examples, the foregoing inputs can be used in combination (e.g., as ML model inputs).

As mentioned, the SCIKIT platform (e.g., scikit-learn) is a framework that includes a machine learning library for PYTHON (see, e.g., Pedregosa et al. 2011). As an example, an ML workflow for the aforementioned Tynemouth example can include:

a. Providing a data set that includes a data structure with the input parameters and results for each of the 250 realizations. For each realization, the data structure can include an entry for maximum burial depth, burial depth at the time of faulting, hydrocarbon density, hydrocarbon-water interfacial tension, hydrocarbon-water contact angle, clay content prediction algorithm, highest sandstone-sandstone juxtaposition elevation, and predicted FWL. The clay content prediction technique variable can be categorical and can be transformed using one-hot encoding prior to applying machine learning.

b. The data set can be split into a training data set of 200 realizations (80% of the data set) and a test data set of 50 realizations (20% of the data set). As explained, such an approach can provide, once the ML model is fitted to the training data set, generalization of performance metrics from evaluations on the test data set, for example, to reduce overfitting of the ML model to data in the data set. As the ML model does not "see" the test data set prior to evaluation, the test data in the test data set provide some indication of how the ML model will perform once other data from one or more other data sets are utilized as input to make predictions using the trained ML model. Splitting into test and training data sets can be performed randomly, for example, using the train_test_split functionality in the SCIKIT platform.

c. A gradient boosting regressor model can be fit to the training data set and grid search cross validation can be used to choose one or more hyperparameters (e.g., hyperparameter values) that give the best performance on the training data set. The performance of the resulting ML model with tuned hyperparameters can be evaluated against the test data set. A reason for applying the gradient boosting model is that it is based on an ensemble of decision trees where output provides indicators of the influence of the different input features in fitting the model to the training data set. Through such a process, a ranking of features can be performed such that an automated, semi-automated and/or a manual approach can determine features that most strongly influence the predicted FWL. In such an example, where a feature does not have a substantial influence, that feature may be dropped or otherwise discounted. As an example, a method can include selecting a top number of ranked features (e.g., one or more features starting from a top ranked downward). As an example, one or more influence ranking models can be utilized to assess a data set or data sets, which may be destined for use in training one or more other models. Such an approach can make a method for analysis of uncertainty more efficient as features with lesser influence and their accompanying uncertainty may be distinguished from features with greater influence to focus on uncertainty in the features with greater influence.

d. A multilayer perceptron model (a simple type of artificial neural network) can be fit to the training data set. In such an approach, a grid search cross validation can be used to select the model hyperparameters that give the best performance on the training data set. The performance of the trained model can be evaluated against the test data set. The resulting trained model can be used to make predictions over a grid search of key input parameters, for example, as ascertained per a gradient boosting regressor model or other suitable model. Output of predicted FWL can be assessed to understand how predicted FWL various responsive to variation in the input parameters, which, as mentioned, may be a number of ranked input parameters. In such an example, a user can readily focus on aspects that have influence above a certain threshold and on how uncertainty in each of the number of ranked input parameters affects predicted FWL to, for example, assess fault seal capability, which may be part of an exploration workflow.

A gradient boosting regressor (GBR) model can involve an ensemble of decision trees, where each tree tries to account for errors of a previous one by fitting to residual errors made by the previous tree (see, e.g., Friedman, 1999). As an example, a GBR model can proceed without scaling or centering of input data prior to fitting the GBR model, and a GBR model can be resistant to overfitting as the depth of each decision tree in the ensemble can be limited. In the Tynemouth data set example, GBR hyperparameters chosen by grid search cross validation were: number of trees=100; maximum depth=3; and learning rate=0.1.

Figure 14:
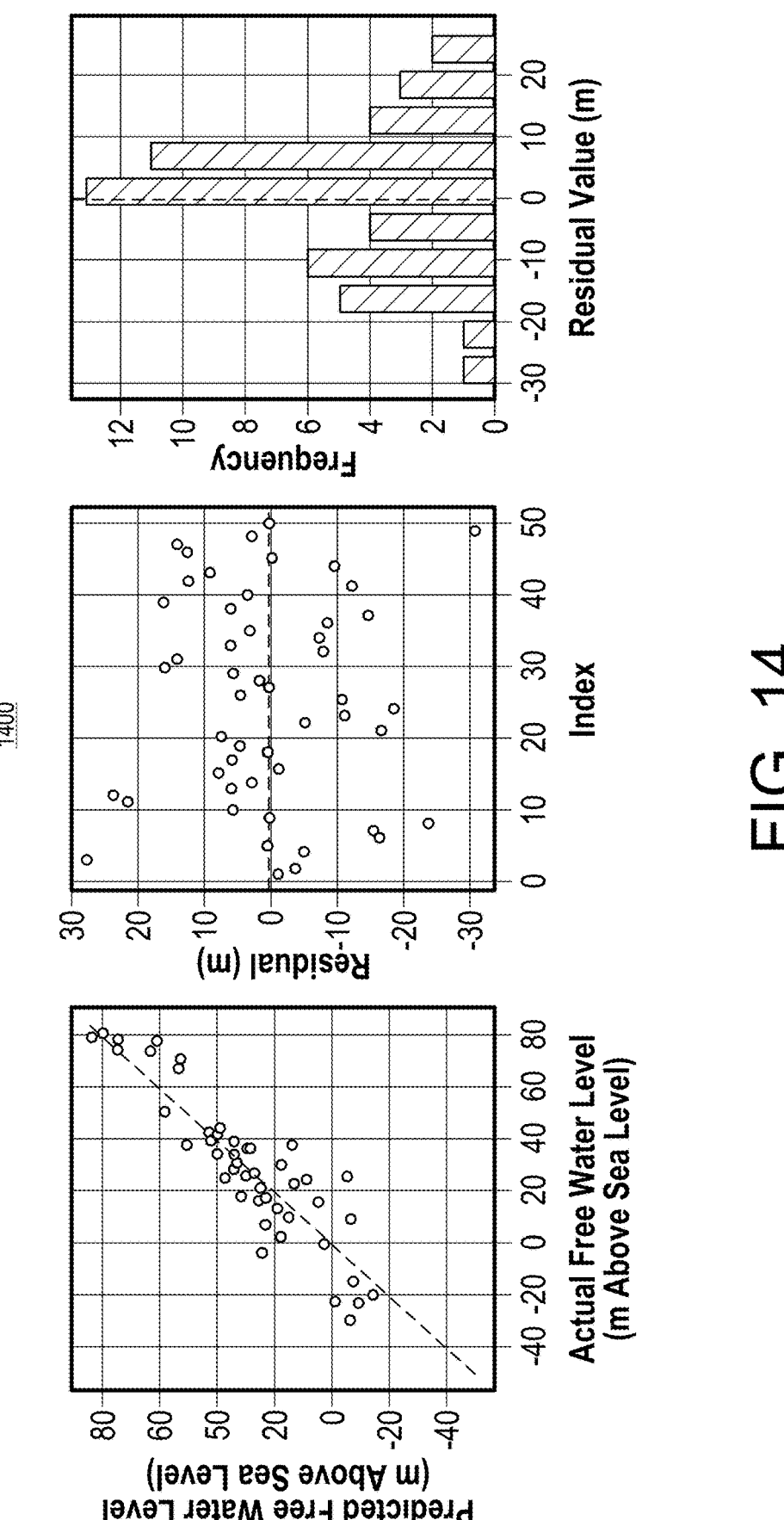
FIG. 14 illustrates examples of graphs.

FIG. 14 shows example graphs 1400 pertaining to the GBR mode in the Tynemouth example. Specifically, FIG. 14 shows performance of the GBR model evaluated on the test data set: FWL predicted by the GBR model plotted against the actual FWL output by the automated workflow, indicating good agreement; residuals; and histogram of residual values showing a close to normal distribution around zero. The GBR model was successful at predicting the FWL, with $R2$ of 0.813 on the test data set. Evaluation of the model against the test data set indicates a good match between the predicted and actual FWLs and there is an approximately normal distribution of residuals around zero. The feature importances show that the two most influential factors influencing the predicted FWL are the elevation of the highest sandstone-sandstone juxtaposition window and the maximum burial depth used in the Sperrevik conversion of predicted clay content to capillary threshold pressure.

Figure 15:
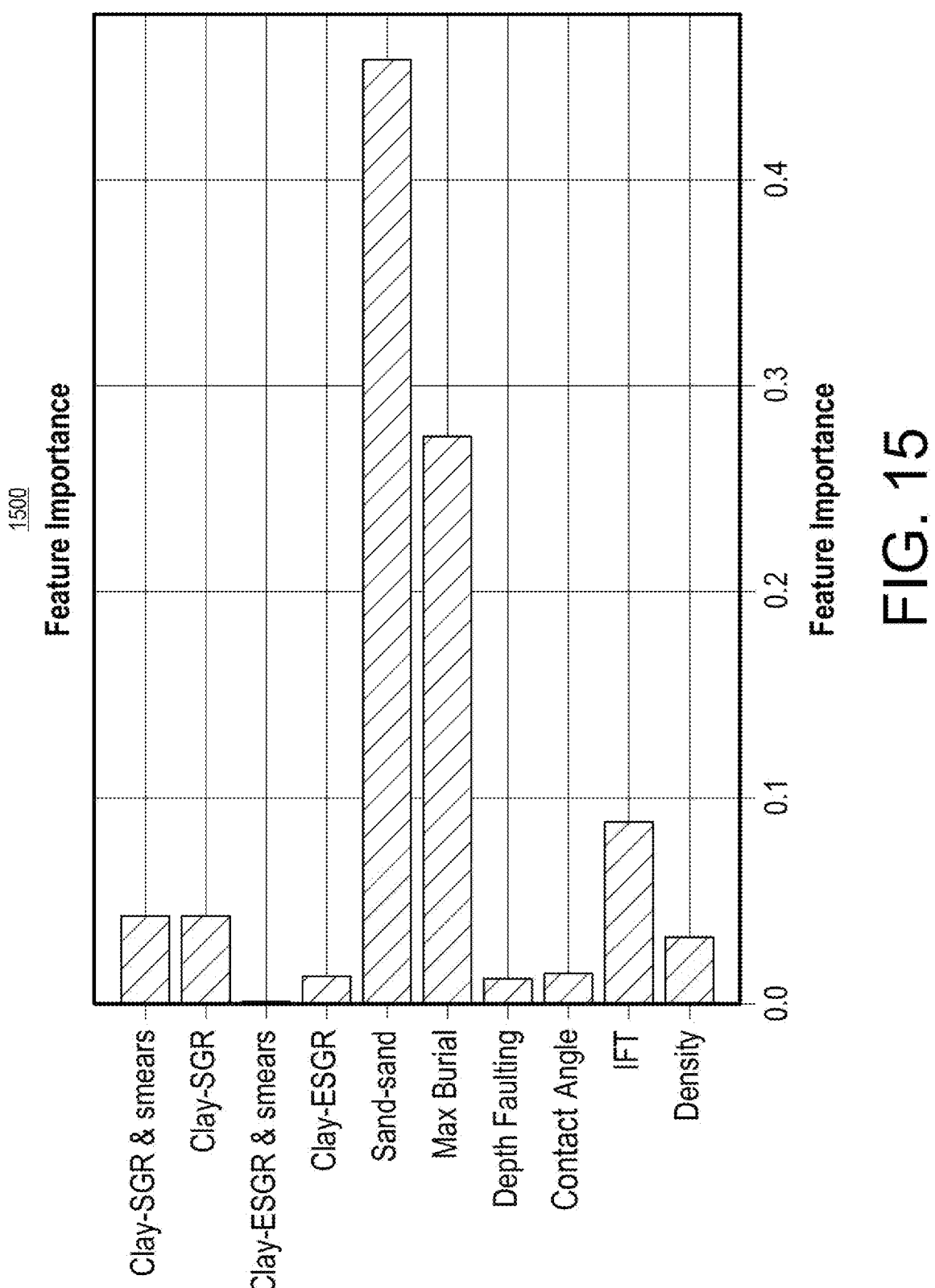
FIG. 15 illustrates an example of a graph.

FIG. 15 shows an example graph 1500 of relative importance of the different input features in fitting the GBR model to the training data set (total=1). Note that the two most influential input features are the highest sandstone-sandstone juxtaposition window and maximum burial depth, with a combined total feature importance of 0.7.

As explained, a predictive model can be generated such as a predictive ML model, which may be a neural network model. For example, consider a multilayer perceptron model (see, e.g., Murtagh, 1991). A multilayer perceptron (MLP) model involves a supervised learning technique that learns a function by training on a dataset where there are a number of dimensions for input and a number of dimensions for output. In such an example, given a set of features and a target, an MLP model can learn a non-linear function approximator for classification or regression. It is different from logistic regression, in that between the input and the output layer, there can be one or more non-linear layers, called hidden layers. As an example, an MLP model can be utilized to address a regression prediction problem, for example, where a real-valued quantity is predicted given a set of inputs. As explained, a set of inputs can be ranked as to influence on a particular parameter where an ML model can be utilized to predict that particular parameter (e.g., values thereof based on one or more of the inputs).

As explained, an MLP model can be a neural network model with an input layer, one or more hidden layers consisting of several threshold logic units (TLUs), and a final output layer of one or more TLUs. In such an example, each TLU can compute a weighted sum of its inputs, then applies a step function and outputs the result to the next layer. The number of nodes in the input layer can be controlled by the number of input features. In the Tynemouth example, as indicated in the graph 1500 of FIG. 15, the number of input features can be ten where each of the input features may have been assessed for its importance (feature importance), for example, using a GBR model and/or one or more other techniques. Where an MLP model is utilized to predict a particular parameter, as a single parameter prediction, the MLP model may have a single node in its output layer. For example, in the Tynemouth example FWL is predicted by a trained MLP model as a type of ML model. The performance of an MLP model tends to be sensitive to the number and size of the hidden layers. As an example, these parameters (e.g., hyperparameters) can be chosen via grid search cross validation and/or one or more other techniques. An MLP model can also be sensitive to the range of values of the inputs. To address range of values of the inputs, data can be scaled, for example, using a technique such as the standard scaler functionality of the SCIKIT platform prior to training.

The SCIKIT platform includes a library class MLPRegressor that implements an MLP that trains using backpropagation with no activation function in the output layer, which can also be seen as using the identity function as an activation function. The SCIKIT platform provides the following for hidden layer activation: identity, no-op activation, useful to implement linear bottleneck, returns f(x)=x; logistic, the logistic sigmoid function, returns f(x)=1/(1+exp(−x)); tan h, the hyperbolic tan function, returns f(x)=tan h(x); and relu, the rectified linear unit function, returns f(x)=max(0, x). The SCIKIT platform provides a hyperparameter alpha as a strength of the L2 regularization term where the L2 regularization term can be divided by the sample size when added to the loss. For the Tynemouth data set, the MLP regressor (e.g., predictor) hyperparameters chosen via grid search cross validation were: hidden layers=2; layer size=100; and alpha=0.1.

Figure 16:
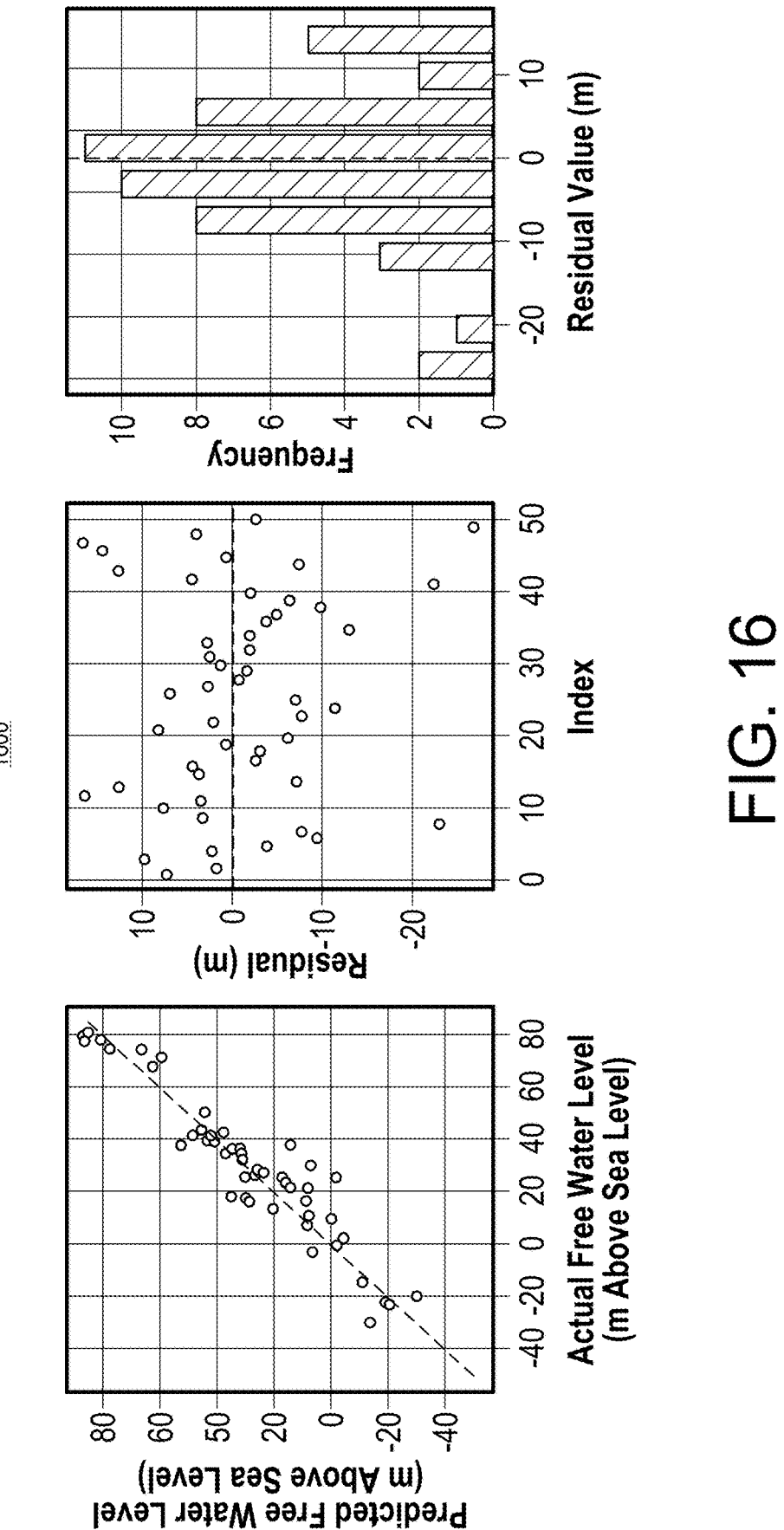
FIG. 16 illustrates examples of graphs.

FIG. 16 shows example graphs 1600 for performance of the trained MLP regressor model evaluated on the test data set for: FWL predicted by the MLP regressor plotted against the actual FWL output by the automated workflow, indicating good agreement; residuals; and histogram of residual values showing a close to normal distribution around zero. A comparison to the GBR model indicates that performance is somewhat improved compared to the GBR model.

As indicated in FIG. 16, for the Tynemouth data set, the trained ML model was successful at predicting the FWL from the input features, with $R2$ of 0.887 on the test data set, somewhat improved over the GBR model. Evaluation of the model performance against the test data set indicates a good match between actual and predicted values, with an approximately normal distribution spread of residuals around zero and a tighter distribution compared to the GBR model.

Having identified the highest sandstone-sandstone window elevation and maximum burial depth as the highest ranked input features in terms of feature importance from the GBR model, the MLP model can be interrogated, for example, to visualize the impact of changes in those two parameters (e.g., features). As an example, a method can include performing a grid search over the range of the highest sandstone-sandstone window elevations and maximum burial depths, with the MLP model being implemented as a predictor to output the predicted FWL for each combination of inputs. As an example, it may be assumed that the other input parameters have constant values, as follows:

| | |
|---|---|
| Hydrocarbon density | 600 kg/m$^3$ |
| Hydrocarbon-water interfacial tension | 30 dyne/cm$^1$ |
| Hydrocarbon-water contact angle | 15° |
| Burial depth at time of faulting | 1500 m |
| Clay content prediction algorithm | SGR only (no clay smears) |

Figure 17:
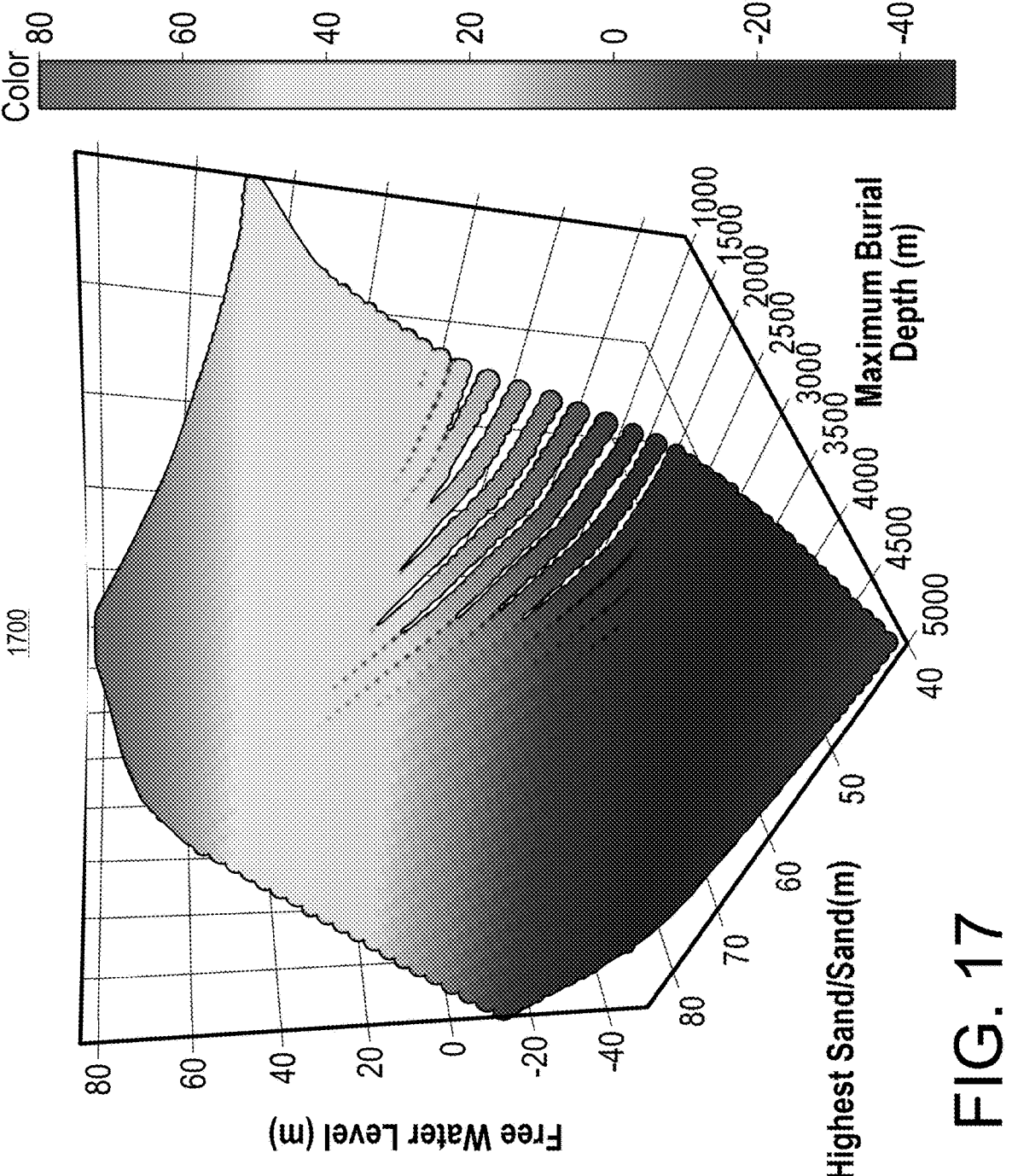
FIG. 17 illustrates an example of a graph.

FIG. 17 shows a 3D plot 1700 of highest sandstone-sandstone juxtaposition window elevation, maximum burial depth, and predicted FWL, illustrating how the predicted FWL varies with varying inputs. In FIG. 17, the 3D plot 1700 shows the FWL predicted by the MLP model for a reasonable range of input highest sandstone-sandstone juxtaposition window elevations and maximum burial depths. The plot 1700 can be produced by performing a grid search over the range of selected input variables while keeping the other inputs constant.

Figure 18:
FIG. 18 illustrates examples of graphs.

FIG. 18 and FIG. 19 show 3D plots 1800 and 1900 as to various other input parameters; for example, the choice of clay content prediction technique used. Specifically, FIG. 18 and FIG. 19 show 3D plots showing the FWL predicted by the MLP model for a reasonable range of input highest sandstone-sandstone juxtaposition window elevations for each of the four different fault clay content prediction techniques employed.

As example, a computation framework or frameworks can provide for analysis using data science techniques, particularly for one or more analyses that may be limited due to an ability of a human to comprehend large amounts of data. As explained, various types of analyses can depend on realizations, which may be parametric realizations that depend on parameters that define a parameter space or parameter spaces with some amount of uncertainty. Realizations can aim to address uncertainty through implementation of one or more sampling techniques that sample parameter values from distributions of parameter values for one or more parameters. In statistics, more samples tend to be better; however, as explained, a human may be ill-suited to comprehend data from more than a few realizations. Through a data science approach, the number of realizations can be increased substantially, for example, to fifty or more, which, as mentioned, may be controlled, optionally in an iterative loop to increase the number of realizations using feedback such as statistical and/or probabilistic feedback, which can include model-based feedback, for example, as to how well a model or models can be trained for one or more purposes (e.g., prediction, classification, etc.). A workflow may employ a funnel-like approach that boils down large amounts of data from fifty or more realizations in a manner that a human can readily ascertain one or more types of uncertainties to facilitate decision making. As an example, a workflow may be performed without a human in the loop (HITL), which may be an automated workflow that can be executed to provide actionable output, whether for action by a human and/or a machine (e.g., a controller, a planner, etc.).

While various examples pertain to a fault-seal analysis problem in an exploration prospect, as mentioned, various methods can be employed to other types of problems. In fault-seal analysis, as in various other geological analyses, there can be considerable uncertainty in inputs. As explained, uncertainties can be in the structural model, facies architecture and petrophysical properties, clay content prediction technique, conversion of predicted clay content to capillary threshold pressure, and reservoir fluid properties. Such uncertainties can be addressed by running fifty or more automated realizations of an analysis workflow with stochastically varying inputs. As an example, outputs can be in the form of a data structure, which may be a spreadsheet containing the input parameters and results (e.g., highest sandstone-sandstone juxtaposition window elevations and predicted FWL), and a set of calculated properties (e.g., fault properties) for each realization. Data analytics and/or machine learning techniques can then be applied to analyze the results, optionally with generation of visualizations.

As to fault seal analysis, a method can provide for considering and assessing a wider range of input uncertainties where results of a large number of realizations can be consolidated and optionally visualized in ways that are specific to a problem being addressed, for example, in a manner readily usable by a geologist undertaking the analysis, and easily communicable to one or more decision makers (e.g., human and/or machine). As mentioned, an overall workflow can be applied to one or more types of geological analyses that are subject to uncertainty.

Figure 20:
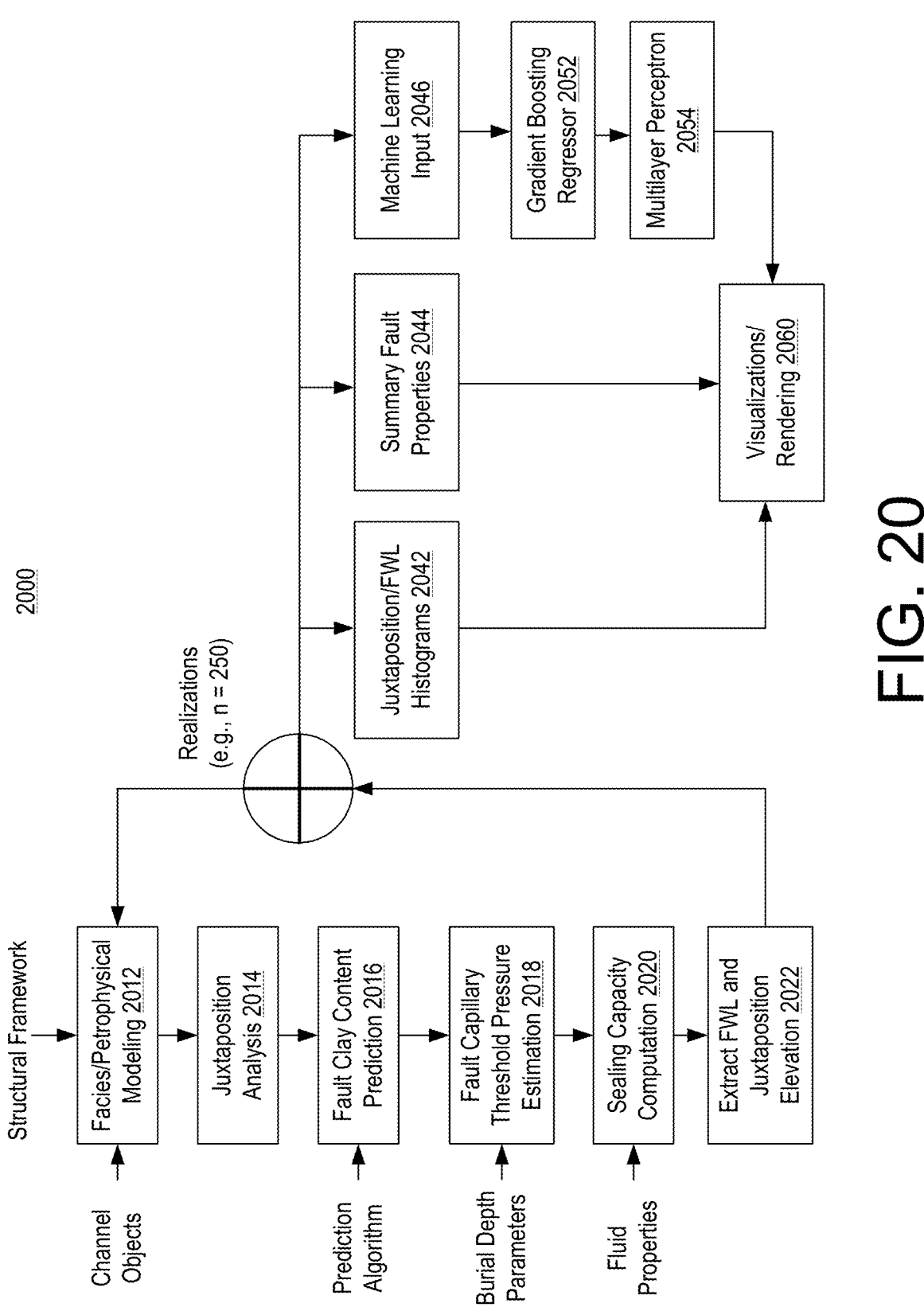
FIG. 20 illustrates an example of a workflow.

FIG. 20 shows an example of a workflow 2000. The example of FIG. is a stochastic workflow where, for example, fault-seal analysis actions may be run for a number of instances, for example, consider running 250 realizations with variable input parameters where results may be utilized for one or more purposes.

As shown, the workflow 2000 can include a loop for running realizations, which may be in series, in parallel, in series and in parallel, etc. As shown, the workflow 2000 can include a facies and/or petrophysical modeling block 2012, a juxtaposition analysis block 2014, a fault clay content prediction block 2016, a fault capillary threshold pressure estimation block 2018, a sealing capacity computation block 2020, and an extract FWL and juxtaposition elevation block 2022. In such an example, the block 2012 can receive a structural framework and channel objects for modeling, the block 2016 can receive output from one or more prediction algorithms, the block 2018 can receive burial depth parameters (e.g., Sperrevik burial depth parameters, etc.) for fault capillary threshold pressure estimation, and the block 2020 can receive fluid properties for sealing capacity computations. As to the burial depth parameters, one or more techniques may be utilized. As to Sperrevik technique, parameters may include, for example, one or more of fault rock clay content, maximum rock burial depth and depth at time of deformation.

As shown, the workflow 2000 can include a juxtaposition/ FWL histograms block 2042, a summary fault properties block 2044, and a machine learning (ML) input block 2046, which can utilize one or more ML techniques. For example, consider the workflow 2000 as including a gradient boosting regressor block 2052 and a multilayer perceptron block 2054. As shown, the blocks 2042, 2044, 2046 can be directly and/or indirectly coupled to a visualization and/or rendering block 2060. As an example, the workflow 2000 can proceed in an iterative manner as to one or more features where, for example, machine learning (ML) may be implemented using a number of realizations as generated, for example, via the blocks 2012, 2014, 2016, 2018, 2020, and 2022.

As an example, a number of realizations may be set by a user and/or by a machine. As an example, a number of realizations may be set to reflect computer resources available, size of the model (e.g., how many cells and fault faces), and amount of time available to run an analysis. In an example trial, 250 realizations were run (see, e.g., output histograms of FIG. 6).

As an example, an automated fault-seal analysis can include, for each realization, implementing stochastic facies and petrophysical modeling processes that are run with different random seed values for each realization where such an approach can allows for an impact of stratigraphic uncertainty to be incorporated into the analysis. As an example, such an approach may be implemented optionally without changes in a structural framework (e.g., faults and horizons) between realizations such that stratigraphic variability is captured through facies and petrophysical modeling (see, e.g., the block 2012).

As an example, a juxtaposition analysis can include using crossfault juxtaposition windows where instances of sandstone (e.g., as defined by the facies model) juxtaposed against sandstone are identified and written to a fault property (see, e.g., the block 2014).

As an example, a fault clay content prediction can be made where an uncertainty in an analysis can be for estimation of fault clay content. In such an example, the uncertainty may be addressed by randomly selecting a clay content prediction algorithm to be used in each realization out of a number of possibilities (see, e.g., the block 2016). In such an example, consider using one or more of the following possibilities: SGR (Yielding et al. 1997); effective SGR (Freeman et al. 2010); SGR combined with clay smears, assuming critical shale smear factor (Lindsay et al. 1993) of three for host rocks with clay content >40%; and effective SGR combined with clay smears using the same assumptions as in the prior (SGR combined with clay smears). As an example, a fault clay content prediction algorithm selected for each realization may be recorded to memory or a storage device such that it may subsequently be utilized by one or more machine learning techniques (see, e.g., the blocks 2046, 2052, 2054, etc.).

As an example, an estimation of fault rock capillary threshold pressure may be generated using a predicted clay content (see, e.g., the block 2018). In such an example, consider using a relationship of Sperrevik et al. (2002), which has inputs of maximum burial depth and burial depth at the time of faulting to be specified as well as fault clay content. As an example, burial depth parameters can vary stochastically between realizations. As an example, uniform distributions may be applied with a range of maximum burial depth (e.g., consider an example trial of between 2000 m and 4000 m), and burial depth at the time of faulting (e.g., consider an example trial of between 1000 m and 2000 m). Such values may be selected as appropriate for a prospect being analyzed and uncertainty in the depth estimates. The Sperrevik capillary threshold pressure relationship may be utilized as a suitable technique as input distributions of the burial depth parameters can be used to obtain a range of predicted fault capillary threshold pressure values for a given clay content (see also Wilson et al. 2021). As an example, burial depth parameters used in each realization may be recorded.

As an example, a conversion of capillary threshold pressure to sealing capacity (in meters of hydrocarbon column) based on fluid properties may be performed (see, e.g., the block 2020). In such an example, water density may be assumed to be constant (e.g., 1115 kg/m$^3$) and, for example, one or more other fluid properties may vary stochastically between realizations (e.g., with uniform distributions, etc.). As an example, hydrocarbon density may vary between approximately 400 kg/m$^3$ and approximately 800 kg/m$^3$, along with hydrocarbon-water contact angle between approximately 0 degrees and approximately 30 degrees, and IFT varying between approximately 20 dyne/cm$^1$ and approximately 40 dyne/cm$^1$. As an example, fluid properties used in each realization can be recorded. As an example, a predicted FWL fault property can be created by subtracting sealing capacity from elevation for each fault face along a fault (e.g., consider a trial utilizing a 90 Fathom Fault).

As an example, an extraction of elevation of a highest relevant sandstone-sandstone juxtaposition window and highest-elevation FWL can be performed (see, e.g., the block 2022), where, for example, Permian sandstone is juxtaposed against Carboniferous sandstone along a downthrown side of a 90 Fathom Fault in an example trial. Such values may be recorded.

As an example, the workflow 2000 can be an automated workflow that can output results, for example, without further data processing or analysis. For example, consider output of the distribution of the highest sandstone-sandstone juxtaposition window elevations across the number of realizations run, which can provide for assessment of risk of hydrocarbon leakage at crossfault sandstone-sandstone juxtaposition windows; and, for example, consider output of the distribution of the predicted FWLs across the realizations, which can provide for assessment of potential for membrane sealing.

Again, FIG. 6 shows distributions for an example trial for the Whitley Bay prospect; noting that, as the Tynemouth model is based on onshore data, the values are both above and below sea level. In the example, trial, particular crossfault sandstone-sandstone juxtaposition windows typically occur at approximately 80 m, close to the maximum elevation of the top of Permian sandstone cutoff on the downthrown side of the 90 Fathom Fault, and at approximately 45 m, with relatively few values in between those two extremes. This result is also reflected in the predicted FWL distribution, with a bimodal distribution that has frequency peaks just below 80 m and 45 m. These results indicate there is a risk of low volumes in the trap where sandstone-sandstone juxtaposition windows occur near the trap crest, but it is more likely that the trap is filled down to 40 m elevation or below.

As explained, a workflow may include various portions such as, for example, an automated fault-seal analysis portion with stochastically varying inputs, including a facies model and numerical inputs to fault-seal analysis. In such an example, Latin hypercube sampling may be utilized to select the numerical input parameters so that coverage of the parameter space is maximized. As an example, outputs for each run can include elevations of the highest sandstone-sandstone juxtaposition window and highest predicted FWL for sandstone-sandstone juxtapositions. As explained, inputs and outputs for each realization can be recorded to a storage device. As an example, various fault properties computed in each realization may also be recorded (e.g., further analysis, etc.). As an example, another portion can include analysis of resulting suites of fault properties using, for example, PYTHON scripts to generate summary fault property statistics across realizations (e.g., median, P10, P90, interquartile range, etc.). As an example, one or more custom fault properties may be computed and used to inform a fault-seal analysis (e.g., sandstone-sandstone juxtaposition probability and probability of SGR<20%). As an example, yet another portion can provide for application of one or more ML techniques, for example, to build one or more predictive models and/or to visualize how FWL predicted by an analysis varies across an input parameter space. As an example, output may be utilized for one or more purposes, which can include planning of drilling, performing drilling, etc. For example, output may be utilized in a control system to control a drill bit that breaks rock of a formation to form a borehole that extends from a surface position to a target position, which may be a reservoir target position of a reservoir for production of reservoir fluid from the reservoir to surface via the borehole.

As an example, the workflow 2000 of FIG. 20 may be adapted to handle one or more other tasks where uncertainty exists. For example, the workflow 2000 may be adapted while uncertainty inherent in an analysis remain present (e.g., incorporated into the workflow) such that the impact of uncertainty can be readily ascertained for one or more decision making processes, whether by humans and/or by machines. As an example, a workflow that includes one or more features of the workflow 2000 may be applied to one or more other geological analyses where uncertainty is a concern. As explained, a geological analysis or geological analyses can form a basis or bases of various operations, include field operations (see, e.g., examples of FIG. 1, FIG. 2, FIG. 3, etc.). Field operations may include, for example, one or more of drilling, seismic surveying, interpreting, logging, fracturing, injecting fluid, producing fluid, completions, pumping, etc.

As an example, a computational environment and/or a computational framework (see, e.g., FIG. 1) may include one or more components for performing a workflow or workflows that can account for uncertainty via stochastics and, for example, that can leverage one or more ML techniques for generation of output.

FIG. 21 shows an example of a method 2100 that includes a generation block 2110 for stochastically generating at least fifty realizations for a subsurface geologic environment by sampling distributions for a number of parameters that characterize the subsurface geologic environment, where the at least fifty realizations represent different results for an actual, physical characteristic of the subsurface geologic environment; a ranking block 2120 for ranking the number of parameters with respect to influence on the different results; and a generation block 2130 for generating result predictions using a trained machine learning model for variations in values of at least the top ranked parameter, where the trained machine learning model is trained using at least a portion of the at least fifty realizations and their corresponding different results.

In the example of FIG. 21, result predictions can correspond to one or more physical objects in the subsurface geologic environment. For example, as explained, free water level (FWL) can be an object that is not known with certainty due to various factors (e.g., data acquisition techniques, sensing technologies, physics-based models, empirical models, variations in subsurface structures, presence of fluid sources and/or sinks, etc.). As an example, an ML model may be utilized to make predictions over a grid search of one or more input parameters where, for example, a computational framework can generate one or more visualizations as to how a predicted FWL varies with variation in the one or more input parameters.

As an example, a method can provide for improving an ability to locate a physical object, which may be a fluid object (e.g., a FWL, etc.). As explained, realizations can be based on data acquired via one or more imaging techniques such as, for example, seismic imaging where a seismic survey may be conducted. Such a technique may be able to discover the apparent presence of a trap (e.g., a trap structure); however, it may not be able to determine whether or not the trap is viable and contains a particular amount of hydrocarbons. As explained, if a trap structure includes a fault, the ability of the trap to accumulate hydrocarbons can depend on the ability of the fault to form a seal. In such an example, the seal itself is an object that can be characterized, which may include characterization as to its location and/or its ability to seal. As explained, FWL can be an indicator of a fault seal's ability to seal, for example, see FIG. 4 where the FWL depends on sealing capacity of fault rock.

In the example of FIG. 21, a system 2190 includes one or more information storage devices 2191, one or more computers 2192, one or more networks 2195 and instructions 2196. As to the one or more computers 2192, each computer may include one or more processors (e.g., or processing cores) 2193 and a memory 2194 for storing the instructions 2196, for example, executable by at least one of the one or more processors. As an example, a computer may include one or more network interfaces (e.g., wired or wireless), one or more graphics cards, a display interface (e.g., wired or wireless), etc.

The method 2100 is shown along with various computer-readable media blocks 2111, 2121, and 2131 (e.g., CRM blocks). Such blocks may be utilized to perform one or more actions of the method 2100. For example, consider the system 2190 of FIG. 21 and the instructions 2196, which may include instructions of one or more of the CRM blocks 2111, 2121, and 2131.

As an example, a method can include stochastically generating at least fifty realizations for a subsurface geologic environment by sampling distributions for a number of parameters that characterize the subsurface geologic environment, where the at least fifty realizations represent different results for an actual, physical characteristic of the subsurface geologic environment; ranking the number of parameters with respect to influence on the different results; and generating result predictions using a trained machine learning model for variations in values of at least the top ranked parameter, where the trained machine learning model is trained using at least a portion of the at least fifty realizations and their corresponding different results. As an example, such a method may optionally be performed without ranking, for example, where one or more parameters may be of known interest for generating result predictions. In various instances, influence of parameters may not be particularly known without an assessment such as a ranking assessment. For example, where the number of parameters increases, there may be greater uncertainty in knowing which parameters have the greatest influence on results. As explained with respect to FIG. 15, an example included ten parameters, noting that in various other examples the number of parameters may be greater or lesser than ten. As an example, a number of parameters may be greater than two, noting that, in general, the greater the number of parameters, the greater the uncertainty where each of the parameters may introduce some amount of uncertainty.

As an example, a method can include ranking that includes implementing a predictive model that determines influence of each of a number of parameters on the different results. In such an example, the method can include implementing gradient boosting to generate the predictive model where, for example, the gradient boosting generates the predictive model from an ensemble of predictive models. As an example, gradient boosted regression (GBR) may be utilized as part of a method that determines influence or feature importance.

As an example, a method can include using a trained machine learning model that includes an input layer, hidden layers and an output layer. In such an example, the trained machine learning model can be a multilayer perceptron (MLP) model.

As an example, an actual, physical characteristic of a subsurface geologic environment can at least in part control accumulation of hydrocarbons in a trap of the subsurface geologic environment. In such an example, the trap can be formed in part by a fault seal where accumulation of hydrocarbons in the trap depends at least in part on characteristics of the fault seal (e.g., ability of the fault seal to seal against migration of fluid into or out of the trap).

As an example, an actual, physical characteristic of a subsurface geologic environment can correspond to presence of a fault in the subsurface geologic environment; noting that a method may consider more than a single fault in a subsurface geologic environment, which may further introduce uncertainty.

As an example, an actual, physical characteristic of the subsurface geologic environment can be a free water level in the subsurface geologic environment. In such an example, the free water level can be indicative of fault sealing ability of a fault in the subsurface geologic environment. As an example, a method can include characterizing a fault as to its fault sealing ability with respect to a hydrocarbon trap.

As an example, a method can include sampling where sampling includes implementing a Latin hypercube sampling technique; noting that one or more other techniques may be implemented.

As an example, a number of parameters can include parameters in a continuous parameter space. In such an example, the number of parameters can include at least one parameter in a discrete parameter space. For example, consider at least one parameter in a discrete parameter space that is an analysis technique parameter that is selectable from a number of different analysis techniques.

As an example, a method can include rendering a visualization of at least a portion of a subsurface geologic environment to a display, where the visualization can include indicia of uncertainty in at least one of the number of parameters. In such an example, the uncertainty may be indicated in a spatial manner, which may be associated with a particular region, a particular structure, etc.

As an example, a method can include rendering a visualization of result predictions with respect to one or more of a number of parameters. For example, consider a 3D plot where two dimensions correspond to two parameters and where a third dimension corresponds to result predictions.

As an example, a method can include generating result predictions that can include predictions for at least an actual, physical characteristic of a subsurface geologic environment. In such an example, a machine learning model or machine learning models may be utilized that can be at least in part trained on stochastically generated realizations of the subsurface geologic environment. As an example, an actual, physical characteristic of a subsurface geologic environment may be a free water level at a location within the subsurface geologic environment. As an example, an ML model may be generated and utilized to make result predictions over a grid search of one or more input parameters where, for example, a computational framework can generate one or more visualizations as to how a predicted FWL varies with variation in the one or more input parameters.

As an example, a method can include increasing a number of realizations based on one or more of an analysis of a ranking and an analysis of result predictions. As explained, a base number of realizations may be generated (e.g., run) where such realizations can be utilized as a basis for modeling using one or more models, which can include one or more ML models. In various instances, a model may demand more data for adequate training and prediction (e.g., regression, etc.) abilities. In such instances, a method can call for more one or more realizations, which may be in batches. For example, consider commencing with fifty and increasing by ten or twenty in an effort to generate sufficient data for training and testing of a model that performs adequately for assessing uncertainty as explained with respect to the example for the Tynemouth data set in the context of fault seal analysis.

As an example, a system can include a processor; a memory accessible by the processor; processor-executable instructions stored in the memory and executable to instruct the system to: stochastically generate at least fifty realizations for a subsurface geologic environment by sampling distributions for a number of parameters that characterize the subsurface geologic environment, where the at least fifty realizations represent different results for an actual, physical characteristic of the subsurface geologic environment; rank the number of parameters with respect to influence on the different results; and generate result predictions using a trained machine learning model for variations in values of at least the top ranked parameter, where the trained machine learning model is trained using at least a portion of the at least fifty realizations and their corresponding different results.

As an example, one or more non-transitory computer-readable storage media can include computer-executable instructions executable to instruct a computing system to: stochastically generate at least fifty realizations for a subsurface geologic environment by sampling distributions for a number of parameters that characterize the subsurface geologic environment, where the at least fifty realizations represent different results for an actual, physical characteristic of the subsurface geologic environment; rank the number of parameters with respect to influence on the different results; and generate result predictions using a trained machine learning model for variations in values of at least the top ranked parameter, where the trained machine learning model is trained using at least a portion of the at least fifty realizations and their corresponding different results.

As an example, a computer program product can include instructions to instruct a computing system to perform one or more methods as described herein.

As an example, a system may include instructions, which may be provided to analyze data, control a process, perform a task, perform a workstep, perform a workflow, etc.

FIG. 22 shows components of an example of a computing system 2200 and an example of a networked system 2210 and a network 2220. The system 2200 includes one or more processors 2202, memory and/or storage components 2204, one or more input and/or output devices 2206, and a bus 2208. In an example embodiment, instructions may be stored in one or more computer-readable media (e.g., memory/storage components 2204). Such instructions may be read by one or more processors (e.g., the processor(s) 2202) via a communication bus (e.g., the bus 2208), which may be wired or wireless. The one or more processors may execute such instructions to implement (wholly or in part) one or more attributes (e.g., as part of a method). A user may view output from and interact with a process via an I/O device (e.g., the device 2206). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2210, which includes a network 2220. The network system 2210 includes components 2222-1, 2222-2, 2222-3, ... 2222-N. For example, the components 2222-1 may include the processor(s) 2202 while the component(s) 2222-3 may include memory accessible by the processor(s) 2202. Further, the component(s) 2222-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereo-graphically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

BIBLIOGRAPHY

Documents Incorporated by Reference Herein in their Entirety

Allan, U. S. 1989. Model for Hydrocarbon Migration and Entrapment within Faulted Structures. *AAPG Bull* 73: 803-811. https://doi.org/10.1306/44B4A271-170A-11D7-8645000102C1865D Bretan, P., Yielding, G., Mathiassen, O. M. et al. 2011. Fault-Seal Analysis for CO2 Storage: An Example from the Troll Area, Norwegian Continental Shelf. *Pet Geosci* 17 (2): 181-192. https://doi.org/10.1144/1354-079310-025

Bretan, P., Yielding, G., and Jones, H. 2003. Using Cali-brated Shale Gouge Ratio to Estimate Hydrocarbon Col-umn Heights. *AAPG Bull* 87 (3): 397-413. https://doi.org/10.1306/08010201128

Brown, A. S. 2003. Capillary Effects on Fault-Fill Sealing. *AAPG Bull* 87: 381-395. https://doi.org/10.1306/08010201127

Childs, C., Walsh, J. J., and Watterson, J. 1997. Complexity in Fault Zone Structure and Implications for Fault Seal Prediction. *Norwegian Petroleum Society Special* Publi-cation 7 (C): 61-72. https://doi.org/10.1016/S0928-8937(97)80007-0

Childs, C., Sylta, O., Moriya, S. et al. 2009. Calibrating Fault Seal Using a Hydrocarbon Migration Model of the Oseberg Syd Area, Viking Graben. *Mar Pet Geol* 26 (6): 764-774. https://doi.org/10.1016/j.marpet-geo.2008.05.004

Clarke, S. M., Littler, M., Burley, S. D. et al. 2006. *Modeling the Effects of* Stratigraphical Uncertainty on Fault Seal and Trap-Fill Faulted Structures. *Pet Geosci* 12 (2): 143-156. https://doi.org/10.1144/1354-079305-683

Conway, D. 2013. *The Data Science Venn Diagram,* 26 Mar. 2013, http://drewconway.com/zia/2013/3/26/the-data-sci-ence-venn-diagram (accessed 30 Mar. 2022).

Corona, F. V., Davis, J. S., Hippler, S. J. et al. 2010. Multi-Fault Analysis Scorecard: Testing the Stochastic Approach in Fault Seal Prediction. *Geol Soc Lond Spec Pub* 347: 317-332. https://doi.org/10.1144/SP347.18

Dee, S. J., Yielding, G., Freeman, B. et al. 2007. *A Com-parison between* Deterministic and Stochastic Fault Seal Techniques. *Geol Soc Lond Spec Pub* 292: 259-270. https://doi.org/10.1144/SP292.15

Fisher, Q. J., Casey, M, Harris, S. D. et al. 2003. Fluid-Flow Properties of Faults in Sandstone: The Importance of Temperature History. *Geol* 31 (11): 965-968. https://doi.org/10.1130/G19823.1

Freeman, S. R., Harris, S. D., and Knipe, R. J. 2008. Fault Seal Mapping—Incorporating Geometric and Property Uncertainty. *Geol Soc Lond Spec Pub* 309: 5-38. https://doi.org/10.1144/SP309.2

Freeman, S. R., Harris, S. D. and Knipe, R. J. 2010. Cross-Fault Sealing, Baffling and Fluid Flow in 3D Geo-logical Models: Tools for Analysis, Visualization and Interpretation. *Geol Soc Lond Spec Pub* 347: 257-282. http://dx.doi.org/10.1144/SP347.15

Friedman, J. 1999. Greedy Function Approximation: A Gradient Boosting Machine. *Ann Stat* 29 (5). https://doi.org/10.1214/aos/1013203451

Hubbert, M. K. 1953. Entrapment of Petroleum Under Hydrodynamic Conditions. *AAPG Bull* 37: 1954-2026. https://doi.org/10.1306/5CEADD61-16BB-11D7-8645000102C1865D James, W. R., Fairchild, L. H., Nakayama, G. P. et al. 2004. Fault-Seal Analysis Using a Stochastic Multifault Approach. *AAPG Bull* 88 (7): 885-904. https://doi.org/10.1306/02180403059

Jones, R. M. and Hillis, R. R. 2003. An Integrated, Quan-titative Approach to Assessing Fault-Seal Risk. *AAPG Bull* 87 (3): 507-524. https://doi.org/10.1306/10100201135

Karolyte, R., Johnson, G., Yielding, G. et al. 2019. Fault Seal Modelling—The Influence of Fluid Properties on Fault Sealing Capacity in Hydrocarbon and $CO_2$ Systems. *Pet Geosci* 26 (3): 481-497. https://doi.org/10.1144/pet-geo2019-126

Knipe, R. J. 1992. Faulting Processes and Fault Seal. In *Structural and Tectonic Modelling and its Application to Petroleum Geology*: Norwegian Petroleum Society Spe-cial Publication 1: 325-342. https://doi.org/10.1016/B978-0-444-88607-1.50027-9

Knipe, R. J., Fisher, Q. J., Jones, G. et al. 1997. Fault Seal Analysis: Successful Methodologies, Application and Future Directions. *Norwegian Petroleum Society Special Publication* 7 (C): 15-38. https://doi.org/10.1016/50928-8937(97)80004-5

Land, D. H. 1974. *Geology of the Tynemouth District.* London, England: Her Majesty's Stationery Office.

Lindsay, N., Murphy, F., Walsh, J. et al. 1993. *Outcrop Studies of Shale Smears on* Fault Surfaces. *Int Ass Sed Spec Pub* 15: 113-123. https://doi.org/10.1002/9781444303957.ch6

Murtagh, F. 1991. Multilayer Perceptrons for Classification and Regression. *Neurocomputing* 2 (5/6): 183-197. https://doi.org/10.1016/0925-2312(91)90023-5

O'Mara, P. T. and Turner, B. R. 1999. Sequence Stratigraphy of Coastal Alluvial Plain Westphalian B Coal Measures in Northumberland and the Southern North Sea. *Int J Coal Geol* 42: 33-62. https://doi.org/10.1016/S0166-5162(99)00028-2

Pedregosa, F., Varoquoax, G., Gramfort, A. et al. 2011. Scikit-Learn: Machine Learning in Python. *J Mach Learn Res* 12: 2825-2830. https://doi.org/10.5555/1953048.2078195

Ridd, M. F., Walker, D. B. and Jones, J. M. 1970. A Deep Borehole at Harton on the Margin of the Northumbrian Trough. *Proc Yorks Geol Soc* 4: 75-103. https://doi.org/10.1144/pygs.38.1.75

Schowalter, T. T. 1979. Mechanics of Secondary Hydrocarbon Migration and Entrapment: *AAPG Bull* 63: 723-760. https://doi.org/10.1306/2F9182CA-16CE-11D7-8645000102C1865D Smith, D. A. 1966. Theoretical Considerations of Sealing and Non-Sealing Faults: *AAPG Bull* 50: 363-374. https://doi.org/10.1306/5D25B48F-16C1-11D7-8645000102C1865D Smith, D. A. 1980. Sealing and Nonsealing Faults in Louisiana Gulf Coast Salt Basin: *AAPG Bull* 64: 145-172. https://doi.org/10.1306/2F918946-16CE-11D7-8645000102C1865D Sperrevik, S., Gillespie, P. A., Fisher, Q. J. et al. 2002. *Empirical Estimation of Fault* Rock Properties. *Norwegian Petroleum Society Special Publication* 11: 109-125. https://doi.org/10.1016/S0928-8937(02)80010-8

Watts, N. L. 1987. Theoretical Aspects of Cap-Rock and Fault Seals for Single- and Two-Phase Hydrocarbon Columns. *Mar Pet Geol* 4: 275-307. https://doi.org/10.1016/0264-8172(87)90008-0

Wehr, F. L., Fairchild, L. H., Hudec, M. R. et al. 2000. Fault Seal: Contrasts Between the Exploration and Production Problem. In *Petroleum Systems of South Atlantic Margins*, eds. M. R. Mello and B. J. Katz, *AAPG Memoir* 73: 121-132. https://doi.org/10.1306/M73705C10

Wilson, P., Smith, S., Povey, D. et al. 2021. *Ranking and Selecting Fault Models* Using Flow-Indicator Fault Properties and Simple Streamline Simulations. *Pet Geosci* 27: 2020-017. https://doi.org/10.1144/petgeo2020-017

Yielding, G., Freeman, B., and Needham, D. T. 1997. Quantitative Fault Seal Prediction. *AAPG Bull* 81 (2): 897-917. https://doi.org/10.1306/522B498D-1727-11D7-8645000102C1865D Yielding, G., Bretan, P., and Freeman, B. 2010. Fault Seal Calibration: A Brief Review. Geol Soc Lond Spec Pub 347: 243-255. https://doi.org/10.1144/SP347.14

Zijlstra, E. B., Reemst, P. H. M., and Fisher, Q. J. 2007. Incorporation of Fault Properties into Production Simulation Models of Permian Reservoirs from the Southern North Sea. Geol Soc Lond Spec Pub 292 (1): 295-308. https://doi.org/10.1144/SP292.17.

What is claimed is:

1. A method comprising:

stochastically generating at least fifty realizations for a subsurface geologic environment by sampling distributions for one or more parameters that characterize the subsurface geologic environment, wherein the at least fifty realizations represent different results for an actual, physical characteristic of the subsurface geologic environment, wherein the one or more parameters comprise pressure, temperature, flowrate, composition, or any combination thereof associated with the subsurface geologic environment, and wherein each of the at least fifty realizations is generated by:

modeling petrophysical properties of the subsurface geologic environment based on the one or more parameters;

performing a juxtaposition analysis of the subsurface geologic environment based on the one or more parameters;

performing a fault clay content prediction for the subsurface geologic environment based on the one or more parameters;

estimating a fault capillary threshold pressure for the subsurface geologic environment based on the one or more parameters; and computing a sealing capacity for the subsurface geologic environment based on the one or more parameters, wherein each of the at least fifty realizations is generated based on a parameter value for each of the one or more parameters for modeling the petrophysical properties, the performing the juxtaposition analysis, the performing the fault clay content prediction, the estimating the fault capillary threshold pressure, and the computing the sealing capacity, wherein the parameter value is different for at least two of:

the modeling of the petrophysical properties;

the juxtaposition analysis;

the fault clay content prediction;

the estimation of the fault capillary threshold pressure; or the computation of the sealing capacity;

ranking the one or more parameters with respect to influence on the different results;

generating one or more result predictions using a trained machine learning model for variations in values of at least a portion of the one or more parameters having a ranking above a threshold, wherein the trained machine learning model is trained using at least a portion of the at least fifty realizations and their corresponding different results, wherein the at least a portion of the at least fifty realizations corresponds to the portion of the one or more parameters, and wherein the one or more result predictions comprise one or more indications of one or more physical objects being present in the subsurface geologic environment; and controlling a drill bit forming a borehole within the subsurface geologic environment based on the one or more result predictions.

2. The method of claim 1, wherein ranking the one or more parameters comprises implementing a predictive model that determines an influence of each of the one or more parameters on the different results.

3. The method of claim 2, comprising implementing gradient boosting to generate the predictive model.

4. The method of claim 3, wherein the gradient boosting generates the predictive model from an ensemble of predictive models.

5. The method of claim 1, wherein the trained machine learning model comprises an input layer, one or more hidden layers, and an output layer.

6. The method of claim 5, wherein the trained machine learning model is a multilayer perceptron model.

7. The method of claim 1, wherein the actual, physical characteristic of the subsurface geologic environment at least in part controls accumulation of hydrocarbons in a trap of the subsurface geologic environment.

8. The method of claim 7, wherein the trap is formed in part by a fault seal, and wherein the accumulation of hydrocarbons in the trap depends at least in part on characteristics of the fault seal.

9. The method of claim 1, wherein the actual, physical characteristic of the subsurface geologic environment is a free water level in the subsurface geologic environment.

10. The method of claim 9, wherein the free water level is indicative of fault sealing ability of a fault in the subsurface geologic environment.

11. The method of claim 1, wherein the sampling comprises implementing a Latin hypercube sampling technique.

12. The method of claim 1, wherein the one or more parameters comprise parameters in a continuous parameter space.

13. The method of claim 1, wherein the one or more parameters comprise at least one parameter in a discrete parameter space.

14. The method of claim 13, wherein the at least one parameter in the discrete parameter space comprises an analysis technique parameter that is selectable from one or more a different analysis techniques.

15. The method of claim 1, comprising rendering a visualization of at least a portion of the subsurface geologic environment to a display, wherein the visualization comprises indicia of uncertainty in at least one of the one or more parameters.

16. The method of claim 1, wherein the one or more result predictions comprise one or more predictions for at least the actual, physical characteristic of the subsurface geologic environment.

17. The method of claim 1, comprising increasing the number of the at least fifty realizations based on one or more of an analysis of the ranking and an analysis of the one or more result predictions.

18. The method of claim 1, wherein the one or more physical objects of the one or more result predictions comprise a free water level, an elevation of a juxtaposition window, or both.

19. A system comprising:

a processor;

a memory accessible by the processor; and processor-executable instructions stored in the memory and executable to instruct the system to:

stochastically generate at least fifty realizations for a subsurface geologic environment by sampling distributions for one or more parameters that characterize the subsurface geologic environment, wherein the at least fifty realizations represent different results for an actual, physical characteristic of the subsurface geologic environment, wherein the one or more parameters comprise pressure, temperature, flowrate, composition, or any combination thereof associated with the subsurface geologic environment, and wherein each of the at least fifty realizations is generated by:

modeling petrophysical properties of the subsurface geologic environment based on the one or more parameters;

performing a juxtaposition analysis of the subsurface geologic environment based on the one or more parameters;

performing a fault clay content prediction for the subsurface geologic environment based on the one or more parameters;

estimating a fault capillary threshold pressure for the subsurface geologic environment based on the one or more parameters; and computing a sealing capacity for the subsurface geologic environment based on the one or more parameters, wherein each of the at least fifty realizations is generated based on a parameter value for each of the one or more parameters for modeling the petrophysical properties, performing the juxtaposition analysis, performing the fault clay content prediction, estimating the fault capillary threshold pressure, and computing the sealing capacity, wherein the parameter value is different for at least two of:

the modeling the petrophysical properties;

the juxtaposition analysis;

the fault clay content prediction;

the estimation of the fault capillary threshold pressure; or the computation of the sealing capacity;

rank the one or more parameters with respect to influence on the different results;

generate one or more result predictions using a trained machine learning model for variations in values of at least a portion of the one or more parameters having a ranking above a threshold, wherein the trained machine learning model is trained using at least a portion of the at least fifty realizations and their corresponding different results, wherein the at least a portion of the at least fifty realizations correspond to the portion of the one or more parameters, and wherein the one or more result predictions comprise one or more indications of one or more physical objects being present in the subsurface geologic environment; and control a drill bit forming a borehole within the subsurface geologic environment based on the one or more result predictions.

20. One or more non-transitory computer-readable storage media comprising computer-executable instructions executable to instruct a computing system to:

stochastically generate at least fifty realizations for a subsurface geologic environment by sampling distributions for one or more parameters that characterize the subsurface geologic environment, wherein the at least fifty realizations represent different results for an actual, physical characteristic of the subsurface geologic environment, wherein the one or more parameters comprise pressure, temperature, flowrate, composition, or any combination thereof associated with the subsurface geologic environment, and wherein each of the at least fifty realizations is generated by:

modeling petrophysical properties of the subsurface geologic environment based on the one or more parameters;

performing a juxtaposition analysis of the subsurface geologic environment based on the one or more parameters;

performing a fault clay content prediction for the subsurface geologic environment based on the one or more parameters;

estimating a fault capillary threshold pressure for the subsurface geologic environment based on the one or more parameters; and computing a sealing capacity for the subsurface geologic environment based on the one or more parameters, wherein each of the at least fifty realizations is generated based on a parameter value for each of the one or more parameters for modeling the petrophysical properties, performing the juxtaposition analysis, performing the fault clay content prediction, estimating the fault capillary threshold pressure, and computing the sealing capacity, wherein the parameter value is different for at least two of:

the modeling the petrophysical properties;

the juxtaposition analysis;

the fault clay content prediction;

the estimation of the fault capillary threshold pressure; or the computation of the sealing capacity;

rank the one or more parameters with respect to influence on the different results;

generate one or more result predictions using a trained machine learning model for variations in values of at least a portion of the one or more parameters having a ranking above a threshold, wherein the trained machine learning model is trained using at least a portion of the at least fifty realizations and their corresponding different results, wherein the at least a portion of the at least fifty realizations correspond to the portion of the one or more parameters, and wherein the one or more result predictions comprise indications of one or more physical objects being present in the subsurface geologic environment; and control a drill bit forming a borehole within the subsurface geologic environment based on the one or more result predictions.

\* \* \* \* \*